United States Patent
Sendrowicz

(10) Patent No.: US 8,031,083 B2
(45) Date of Patent: Oct. 4, 2011

(54) COMMUNICATION NODES FOR USE WITH AN AD-HOC NETWORK

(75) Inventor: Gerry Sendrowicz, Ottawa (CA)

(73) Assignee: Olsonet Communications Corporation, Ottawa (CA)

(*) Notice: Subject to any disclaimer, the term of this patent is extended or adjusted under 35 U.S.C. 154(b) by 0 days.

(21) Appl. No.: 12/832,386

(22) Filed: Jul. 8, 2010

(65) Prior Publication Data

US 2010/0272027 A1 Oct. 28, 2010

Related U.S. Application Data

(63) Continuation of application No. 11/524,276, filed on Sep. 21, 2006, now Pat. No. 7,782,226, which is a continuation of application No. 10/342,279, filed on Jan. 15, 2003, now Pat. No. 7,113,106.

(60) Provisional application No. 60/347,885, filed on Jan. 15, 2002, provisional application No. 60/347,886, filed on Jan. 15, 2002, provisional application No. 60/347,887, filed on Jan. 15, 2002, provisional application No. 60/347,888, filed on Jan. 15, 2002, provisional application No. 60/358,722, filed on Feb. 25, 2002.

(51) Int. Cl.
*G08C 19/06* (2006.01)
(52) U.S. Cl. ............. 340/870.06; 455/436; 340/870.07; 370/236; 370/254; 370/331; 709/230
(58) Field of Classification Search ............ 340/870.06–870.07; 455/436; 370/236, 331, 254; 709/230
See application file for complete search history.

(56) References Cited

U.S. PATENT DOCUMENTS

| | | | | |
|---|---|---|---|---|
| 5,896,373 A | * | 4/1999 | Mitts et al. | 370/331 |
| 5,986,574 A | | 11/1999 | Colton | |
| 5,987,011 A | * | 11/1999 | Toh | 370/331 |
| 6,028,857 A | | 2/2000 | Poor | |
| 6,301,257 B1 | | 10/2001 | Johnson et al. | |
| 6,552,525 B2 | | 4/2003 | Bessler | |
| 6,754,188 B1 | | 6/2004 | Gahari et al. | |
| 6,870,816 B1 | | 3/2005 | Edwards et al. | |
| 6,912,205 B2 | * | 6/2005 | Perlman et al. | 370/254 |

(Continued)

OTHER PUBLICATIONS

Johnson et al., The Dynamic Source Routing Protocol for Mobile Ad-Hoc Networks (DSR), Draft IETF-Manet-DSR-7, Feb. 21, 2002, IEFT MANET Working Group Publication.

(Continued)

*Primary Examiner* — Albert Wong
(74) *Attorney, Agent, or Firm* — Michael E. Kondoudis; The Law Office of Michael E. Kondoudis

(57) ABSTRACT

Communication nodes for use with a wireless ad-hoc communication network are disclosed. In an embodiment of the present invention, the communication node comprises a transducer, which generates a signal in response to an external signal. The ad-hoc network communication is supported in part by static communication nodes, which defined an organized infrastructure network in order to achieve the various functions of the transducers. In another embodiment, the communication node for use with a wireless ad-hoc network does not include a transducer. Such communication nodes are preferred for use with a less structured network with virtually no infrastructure and allow for being used with expanding and contracting networks. Mobile communication nodes mostly support the propagation of signals. However, pseudo-static or static communication nodes are also used in wireless communication ad-hoc networks.

17 Claims, 14 Drawing Sheets

U.S. PATENT DOCUMENTS

| | | | |
|---|---|---|---|
| 6,985,087 | B2 | 1/2006 | Soliman |
| 6,990,075 | B2* | 1/2006 | Krishnamurthy et al. .... 370/236 |
| 7,061,924 | B1 | 6/2006 | Durrant et al. |
| 7,159,035 | B2 | 1/2007 | Garcia-Luna-Aceves et al. |
| 7,184,413 | B2* | 2/2007 | Beyer et al. .................... 370/254 |
| 7,184,421 | B1 | 2/2007 | Liu et al. |
| 7,362,727 | B1* | 4/2008 | O'Neill et al. ................ 370/331 |
| 7,366,113 | B1 | 4/2008 | Chandra et al. |
| 7,379,981 | B2 | 5/2008 | Elliott et al. |
| 7,552,246 | B2* | 6/2009 | Mahany et al. ................. 710/18 |
| 7,558,557 | B1* | 7/2009 | Gollnick et al. ........... 455/343.4 |
| 2002/0122410 | A1 | 9/2002 | Kulikov et al. |

OTHER PUBLICATIONS

Alagar et al., Reliable Broadcast in Mobile Wireless Networks, Proc. Mil. Comm. Conf (MILCOM), 1995, pp. 236-240, Institute of Electrical and Electronic Engineers (IEEE).

Wu et al., Route Maintenance in a Wireless Mobile Ad-Hoc Network, Proceedings of the 33rd Hawaii International Conference on System Sciences, 2000, pp. 1-10, vol. 8, Institute of Electrical and Electronic Engineers (IEEE).

Leung et al., MP-DSR: A QoS-aware Multi-Path Dynamic Source Routing Protocol for Wireless Ad-Hoc Networks, Proc. 26th IEEE Conf. Local Computer Networks, 2001, pp. 132-141, Institute of Electrical and Electronic Engineers (IEEE).

Johnson et al., Dynamic Source Routing in Ad-Hoc Wireless Networks, Mobile Computing, 1996, vol. 353, Kluwer Academic Publishers.

Dube et al., Signal Stability Based Adaptive Routing (SSA) for Ad-Hoc Mobile Networks, IEEE Personal Communications, Feb. 1997, pp. 36-45, IEEE Communications Society.

Chen et al., Global State Routing: A New Routing Scheme for Ad-Hoc Wireless Networks, Proc. IEEE ICC 98, Jun. 1998, Institute of Electrical and Electronic Engineers (IEEE).

Chiang et al., On Demand Multicast in Mobile Wireless Networks, Proc. ICNP 98, 1998.

Murthy et al., An Efficient Routing Protocol for Wireless Networks, Mobile Networks and Applications, Oct. 1996, pp. 183-197, vol. 1, No. 2, Kluwer Academic Publishers, Hingham, MA, U.S.A.

Toh, A Novel Distributed Routing Protocol to Support Ad-Hoc Mobile Computing, Proc. 15th IEEE Phoenix Conf. Computers and Communications, 1996, pp. 480-486, Institute of Electrical and Electronics Engineers (IEEE).

* cited by examiner

COMMUNICATION NODES FOR USE WITH AN AD-HOC NETWORK

CROSS-REFERENCE TO RELATED APPLICATION

This application claims priority as a Continuation of U.S. patent application Ser. No. 11/524,276 filed Sep. 21, 2006 entitled "Communication Nodes for Use with a Wireless Ad-Hoc Communication Network", which itself claims priority from U.S. patent application Ser. No. 10/342,279 filed Jan. 15, 2003 entitled ""Communication Nodes for Use with a Wireless Ad-Hoc Communication Network" and issued as U.S. Pat. No. 7,113,106, which itself claims priority from U.S. Provisional Patent Applications Ser. No. 60/358,722 filed Feb. 25, 2002, Ser. No. 60/347,885 filed Jan. 15, 2002, Ser. No. 60/347,886 filed Jan. 15, 2002, Ser. No. 60/347,887 filed Jan. 15, 2002, and Ser. No. 60/347,888 filed Jan. 15, 2002

FIELD OF THE INVENTION

This invention relates to data communication networks and more specifically to the area of an ad-hoc data communication network having flexible network topology.

BACKGROUND OF THE INVENTION

Large-scale communication networks are typically supported by an infrastructure, which supports communication between distant individuals, for example the regular mail system, the telephone or electronic message system. In such communication networks, when a person dials a number or writes an address, the phone call, the letter or the electronic mail message is sent through an organized structure, which eventually allows for tracking the path of the message, until it reaches its destination. The construction of such infrastructure necessitates high capital cost expenditure, long-term planning and international compatibility between materials and processors having different origins to be able to connect together and provide the expected connections and services.

To provide more latitude to users and to increase the communication capabilities between people, cellular telephone networks have been established. When a cellular telephone is used, there must exist "towers" or antennas that transmit and receive signals from each cellular telephone. Current cellular telephone networks typically transmit over a long distance to a cellular tower, and cellular phones transmit and receive information from the receiver tower, which is located, many hundreds of meters away. This requires an initial infrastructure investment before cellular telephones function adequately with reasonable areas of coverage. As a result, powerful transmitters are required within the cellular phones, as well as requiring finely tuned receivers within the cellular phones, in order to be able to reliably receive and transmit information over these long distances. Analogous situations exist for telephone networks, satellite communication networks, and so forth. Unfortunately, the infrastructure costs are often non-recoverable capital expenses and end up dictating the overall cost of a service. Further, changing technologies are more difficult to implement due to the lag time associated with infrastructure costs and infrastructure cost recovery. Inconveniently, when a cellular phone is not in the transmission/reception range of a cellular tower, no communication service is provided to the cellular phone. In such dead zones, having a cellular phone is useless. Further inconveniently, when a cellular tower has reached its capacity in relaying communication signals, a request to make another cellular telephone call using that tower will not be permitted and will remain such as long as another user does not end his communication session or leave the area. Of course, to avoid such traffic overload, one option is to build and use another cellular tower. However, it is not a preferred option for municipalities or telephone companies because of the non-profitable expense incurred. Furthermore, large areas exist which are not equipped with cellular tower. This is a major inconvenience when someone accustomed to using a cellular phone travels from a supported region or suburban area toward an unsupported region.

SUMMARY OF THE INVENTION

In accordance with a preferred embodiment of the present invention, there is provided a network comprising:

a plurality of communication nodes including at least one communication node in wireless transmission range of another communication node, the at least one communication node comprising:

a processor;

a transducer, in communication with the processor for sensing a first physical parameter and for providing a first signal including data relating to the first physical parameter;

a receiver, in communication with the processor for receiving a second signal from a communication node in wireless transmission range;

a transmitter in communication with the processor for transmitting a third signal to another communication node in wireless transmission range and for re-transmitting some received second signals from a communication node in wireless transmission range to another communication node in wireless transmission range; wherein the processor for identifying a received second signal as one of destined for the communication node and other than destined for the communication node and for, when the identification is indicative of the second signal being destined for other than the communication, relaying the received second signal via the transmitter and, when the identification is indicative of the second signal being destined for the communication node, providing an indication to a receiving party of the received second signal, and the processor for generating the third signal for transmission, wherein the third signal includes at least the first signal.

In accordance with another preferred embodiment of the invention there is provided a vehicle network comprising:

a plurality of communication nodes including at least one communication node installed in a vehicle in wireless transmission range of another communication node, the at least one communication node comprising:

a receiver for receiving a signal having protocol data attached therein, the signal received from a communication node in wireless transmission range;

a protocol processor for identifying the attached protocol data and for in accordance with an ad-hoc network protocol performing one of re-transmitting the received signals received from a communication node in wireless transmission range to another communication node in wireless transmission range and other than re-transmitting the received signal; and, a transmitter for transmitting the signal to another communication node in wireless transmission range;

wherein the ad-hoc network protocol is in accordance with a use of a wireless vehicle ad-hoc network.

In accordance with another preferred embodiment of the invention there is provided a parknet comprising:

a plurality of communication devices for being carried by a park's visitors, the plurality of communication devices including at least one communication device in wireless transmission range of another communication device, the at least one communication device comprising:

a receiver for receiving a signal having protocol data attached therein, the signal received from a communication device in wireless transmission range;

a protocol processor for identifying the attached protocol data and for in accordance with an ad-hoc protocol performing one of re-transmitting the received signals received from a communication device in wireless transmission range to another communication device in wireless transmission range and other than re-transmitting the received signal; and, a transmitter for transmitting the signal to another communication device in wireless transmission range;

wherein the ad-hoc network protocol is in accordance with a use of a wireless ad-hoc parknet.

In accordance to another embodiment of the invention the parknet also comprising:

a second plurality of communication devices, each communication device from the second plurality of communication devices comprising:

a second receiver for receiving a signal having protocol data attached therein, the signal received from a communication device in wireless transmission range;

a second protocol processor for identifying the attached protocol data and for in accordance with a parknet ad-hoc protocol performing one of re-transmitting the received signals received from a communication device in wireless transmission range to another communication device in wireless transmission range and other than re-transmitting the received signal; and, a second transmitter for transmitting the signal to another communication device in wireless transmission range;

wherein the transmission range of each communication device from the first plurality of communication devices is shorter than the transmission range of each communication device from the second plurality of communication devices.

In accordance with another preferred embodiment of the invention, there is provided a cruisenet comprising:

a plurality of communication devices for being carried by users disembarking from a cruise ship, the plurality of communication devices including at least one communication device in wireless transmission range of another communication device, the at least one communication device comprising:

a receiver for receiving a signal having protocol data attached therein, the signal received from a communication node in wireless transmission range;

a protocol processor for identifying the attached protocol data and for in accordance with an ad-hoc protocol performing one of re-transmitting the received signals received from a communication device in wireless transmission range to another communication device in wireless transmission range and other than re-transmitting the received signal; and, a transmitter for transmitting the signal to another communication device in wireless transmission range;

wherein the ad-hoc network protocol is in accordance with a use of a wireless ad-hoc cruisenet.

In accordance with another preferred embodiment of the invention, there is provided a boatnet comprising:

a plurality of communication devices including at least one communication device in wireless transmission range of another communication device, the at least one communication device comprising:

a receiver for receiving a signal having protocol data attached therein, the signal received from a communication node in wireless transmission range;

a protocol processor for identifying the attached protocol data and for in accordance with an ad-hoc protocol performing one of re-transmitting the received signals received from a communication device in wireless transmission range to another communication device in wireless transmission range and other than re-transmitting the received signal; and, a transmitter for transmitting the signal to another communication device in wireless transmission range;

wherein the ad-hoc network protocol is in accordance with a use of a wireless ad-hoc boatnet.

In accordance with another preferred embodiment of the invention, there is provided a skinet comprising:

a plurality of communication devices for being carried by users in ski resorts, the plurality of communication devices including at least one communication device in wireless transmission range of another communication device, the at least one communication device comprising:

a receiver for receiving a signal having protocol data attached therein, the signal received from a communication device in wireless transmission range;

a protocol processor for identifying the attached protocol data and for in accordance with an ad-hoc protocol performing one of re-transmitting the received signals received from a communication device in wireless transmission range to another communication device in wireless transmission range and other than re-transmitting the received signal; and, a transmitter for transmitting the signal to another communication device in wireless transmission range;

wherein the ad-hoc network protocol is in accordance with a use of a wireless ad-hoc skinet.

In accordance with another preferred embodiment of the invention, there is provided an ad-hoc network comprising:

a first plurality of transceivers and a second plurality of transceivers, each transceiver from the first plurality of transceivers and from the second plurality of transceivers comprising:

a receiver for receiving a signal having protocol data attached therein the signal received from a transceiver in wireless transmission range, a protocol processor for identifying the attached protocol data and for in accordance with an ad-hoc protocol performing one of re-transmitting the received signals and other than re-transmitting the received signal; and, a transmitter for transmitting the signal;

wherein the transmission range of each transceiver from the first plurality of transceivers is shorter than the transmission range of each transceiver from the second plurality of transceivers.

BRIEF DESCRIPTION OF THE DRAWINGS

Exemplary embodiments of the invention will now be described in conjunction with the following drawings, in which:

FIG. 1b is a simplified bloc diagram of a household consumption ad-hoc network comprising a plurality of houses in a neighborhood equipped with the wireless household consumption meter of FIG. 1a;

DETAILED DESCRIPTION

Figure 1A:
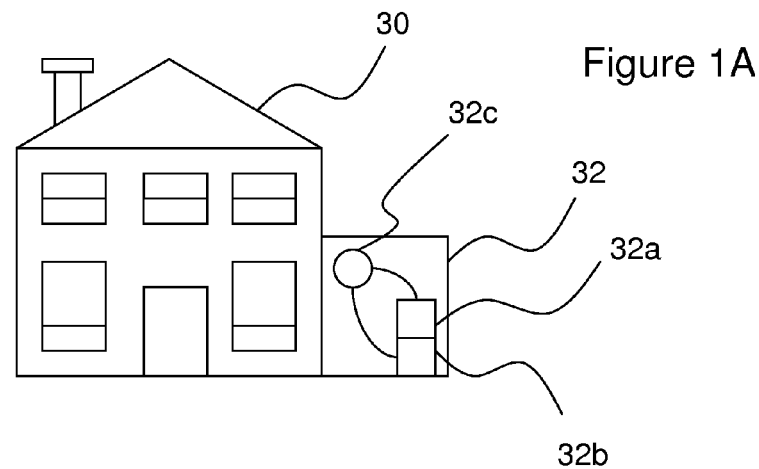
FIG. 1a is a bloc diagram of a house equipped with a wireless household consumption meter having a communication system integrated therein for use in an ad-hoc network.

An ad-hoc network is a dynamic collection of possibly mobile hosts capable of communicating reliably without the aid of any pre-established infrastructure. The network topology varies as communication nodes are added, moved and removed from the network. Ad-hoc networks differ from traditional networks in that the topology of interconnections between nodes is inherently dynamic and generally unpredictable. Consequently, ad-hoc networks do not rely on a centralized authority to coordinate routing of messages therein.

The dynamic aspect of an ad-hoc network renders the configuration of the network flexible because sometimes nodes appear and are added to the network or nodes disappear and are removed from the network. Advantageously, transmitters and receivers used within a wireless communication ad-hoc network of the invention are relatively inexpensive, because of their short range as well as limited bandwidth. Advantageously, this allows for a plurality of data type to be transmitted within this type of network.

Unfortunately, even ad-hoc networks have certain minimum requirements. Clearly to communicate between two nodes of an ad-hoc network, a network must be formable therebetween—typically in an ad-hoc fashion—at the time of the communication. According to embodiments set out below, the communication node for use with the ad-hoc network comprises a transducer, which generates a signal in response to an external signal. This is described using two exemplary embodiments of such ad-hoc networks where the transducer corresponds to a household consumption meter and to a household security monitoring system. Both of these embodiments allow for wide area support for an ad-hoc network by providing many closely spaced nodes.

Typically, houses are equipped with water meters to meter water consumption for the house. Initially the reading of water meters was accomplished by having a water company representative enter the house and then record numbers indicative of water consumption for the house. Unfortunately, this method is quite obtrusive and requires a member of the house to be home in order to allow access to the water company representative. In order to minimize this obtrusiveness, water companies have installed a circuit within the water meter and coupled to this circuit an external monitor panel, where the external monitor panel was placed outside of the house. Having the monitor panel outside of the house allows for the water company representative to couple a monitoring apparatus to the external monitoring panel in order to retrieve from the circuit water consumption for the house. Although the obtrusiveness has been removed through this method, it still involves the costly operation of having the water company representative go to each house in order to obtain water consumption readings.

In order for the water company to minimize the amount of time spent taking meter readings wireless transmitters (Tx) have been installed within water meter circuits for use in monitoring thereof. A water consumption receiver receives the transmitted water meter reading transmitted at a carrier frequency and including a water consumption value. Having this type of wireless communication provides for a number of advantages for the water company. Firstly water readings can be taken from a vehicle located a distance from the house; this saves time since the water company representative does not need to leave the vehicle in order to take a reading. Secondly, more houses can be monitored in at a given time since (a) the representative does not need to leave the vehicle and (b) signals on different carrier frequencies are usable for different homes.

Referring to FIG. 1a, a wireless household consumption meter having an ad-hoc wireless communication system for use with an ad-hoc network according to an embodiment of the present invention is shown. The wireless household consumption meter (HCM) 32 includes a transmitter 32a and a receiver 32b for transceiving wireless signals. The HCM also includes a processor 32c in communication with the transmitter 32a and the receiver 32b, the processor for identifying the wireless signals. Typically, such a HCM 32 is located outside a house 30.

Figure 1B:
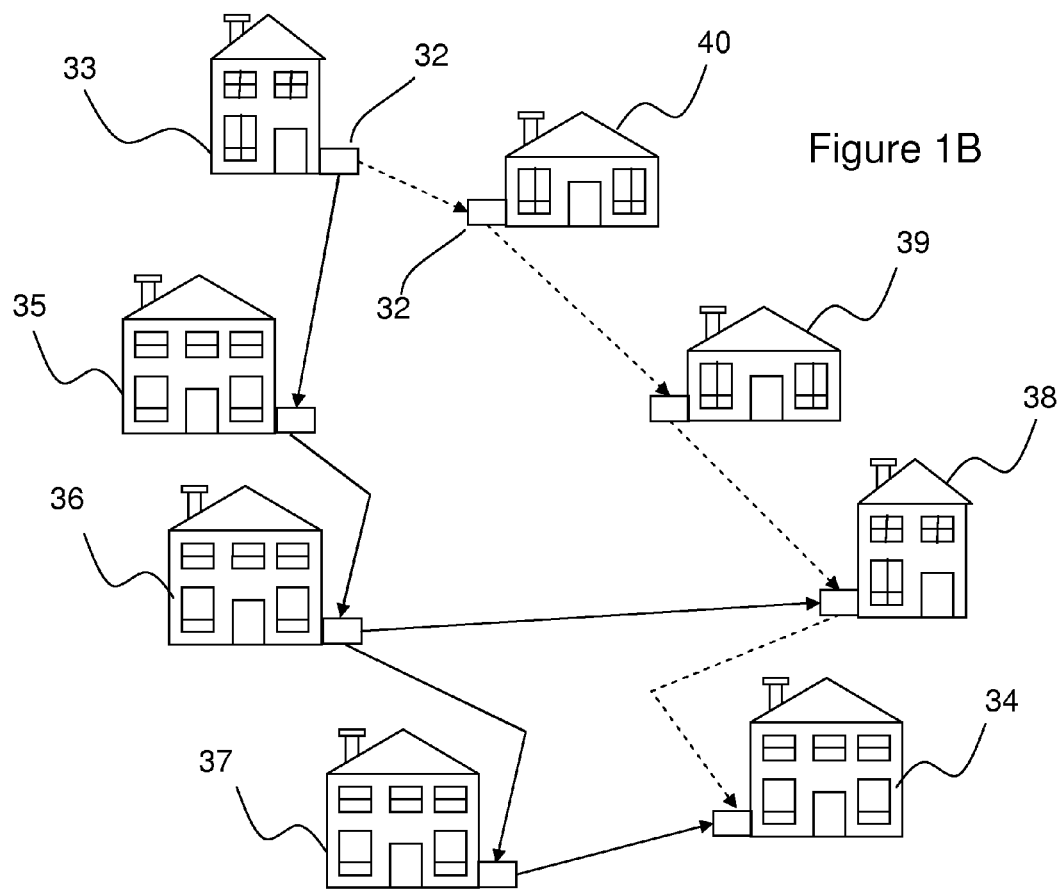

Referring to FIG. 1b, a simplified block diagram of a household consumption ad-hoc network (HCMN) for a plurality of houses in a neighbourhood is shown. Each of the houses 30 in the ad-hoc network is equipped with the HCM 32, as shown in FIG. 1a. Within a typical neighbourhood utilizing HCM there will be a plurality of houses 33-40 within close proximity of each other, where each of these houses has a HCM 32 installed for measuring household consumption thereof. Upon being installed, a HCM periodically transmits a contact signal to the surrounding HCMs, installed in the neighborhood within the transmission range of the HCM, indicating its presence. Every node in the transmission vicinity of a new node processes the contact signal such that when a signal is transmitted from a node to another node, the new node is part of the relaying path.

According to an embodiment of the present invention, as shown in FIG. 1b, each of the communication devices periodically transmits a contact signal. Thus, a HCM at house 38, for example, is aware that the HCMs at houses 39, 36 and 34 are in its transmission/reception range. Of course, the contact signal of houses 36 and 39 is different from the contact signal of house 34, which corresponds to the central station collecting the household consumption information from the nodes belonging to the ad-hoc network. Advantageously, with such an application, each node does not need to transmit a contact signal very often. Further advantageously, the central station also transmits contact signals to ensure the functionality of the HCM and eventually the amount of water, gas or electricity for example consumption meters expected to return water, gas or electricity consumption value upon a request.

Optionally, the central station 34 is vehicle-based belonging to a utility company. A driver of the vehicle drives from neighborhood to neighborhood and read the household meters via the ad-hoc network.

Within a community using the HCM network (HCMN), distances between Tx/Rxs (transmitters and corresponding receivers) are quite small, typically in the order of a few tens of meters. This allows for setting up of the HCMN. A HCM communication device is used in order to transmit and receive messages to other HCM communication devices within the HCMN.

Each HCM communication devices within the HCMN is set to read water, gas or electricity consumption and to provide a consumption value (HCV) indicative of the household water, gas or electricity consumption to the HCMN. The HCM transmits along the predetermined frequency using the predetermined protocol, providing its consumption value to other HCM communication devices within the HCMN. The HCV from each meter propagates through the wireless HCMN from meter to meter until it reaches a central station 34. At the central station the value obtained from the first meter is noted.

Each meter within the HCMN is either set by the central station or set to provide a reading after an elapsed amount of time. Since the value reading from each HCM propagated through the HCMN to the central station, the central station also communicates with each HCM through a plurality of HCMs within the HCMN. The predetermined protocol determines which HCM are read from and which are used to relay information.

In another embodiment, the central station 34 is not proximate the HCM. Therefore in order to obtain a consumption value from the HCM, the central station uses the predetermined protocol and communicates with any meter within the HCMN to obtain the consumption value from each HCM.

Having this type of HCMN provides a number of advantages for the companies. First, it reduces the need for having to drive around streets contained within at least a portion of the HCMN in order to obtain consumption values for the plurality of houses within the at least a portion of the HCMN, providing a significant cost savings for the companies. Second, it also allows the companies to take meter readings more often; the readings performed automatically through the ad-hoc network. Third, the HCMV is obtainable as often as desired at little or no additional cost, which represents an asset if for example a leak of water or gas is suspected in an area or if a HCMV obtained is way out of a normal consumption value, and so forth.

Figure 2A:
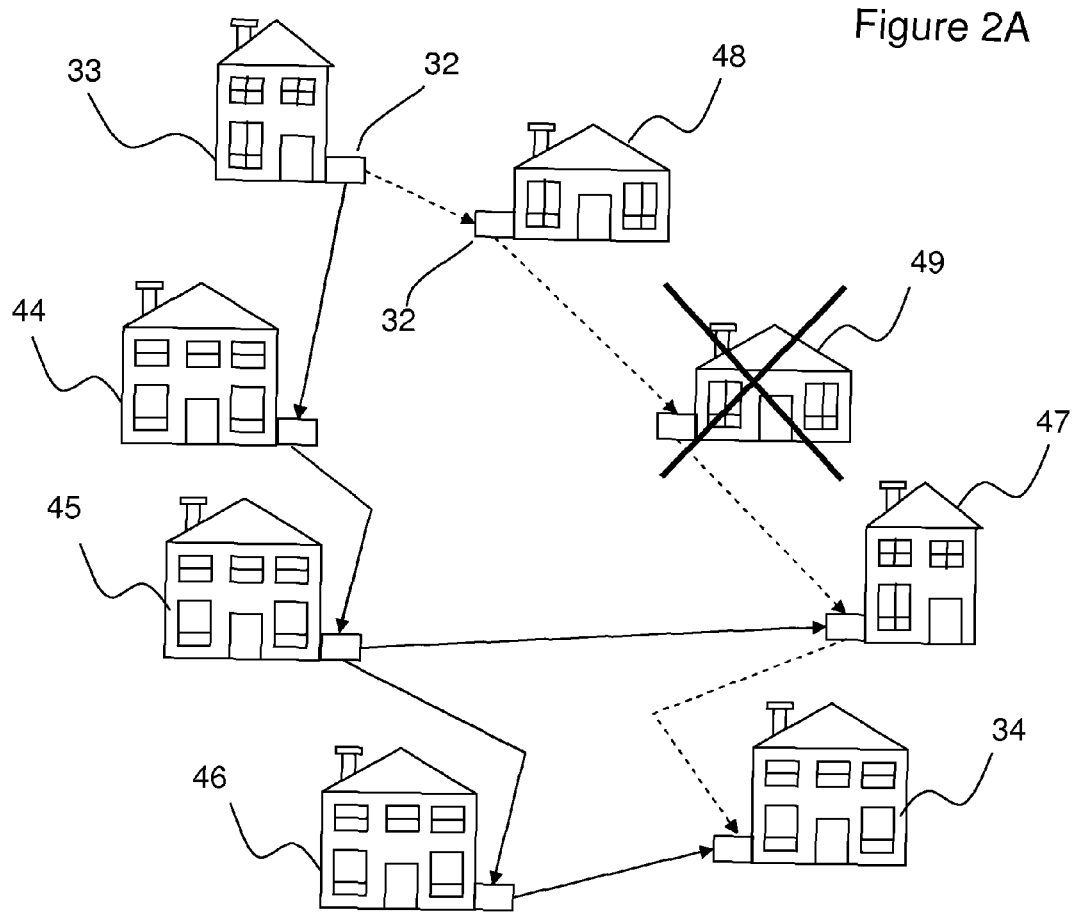
FIG. 2a is a simplified bloc diagram of a household consumption ad-hoc network when a node disappears from the network of FIG. 1b.
Figure 2B:
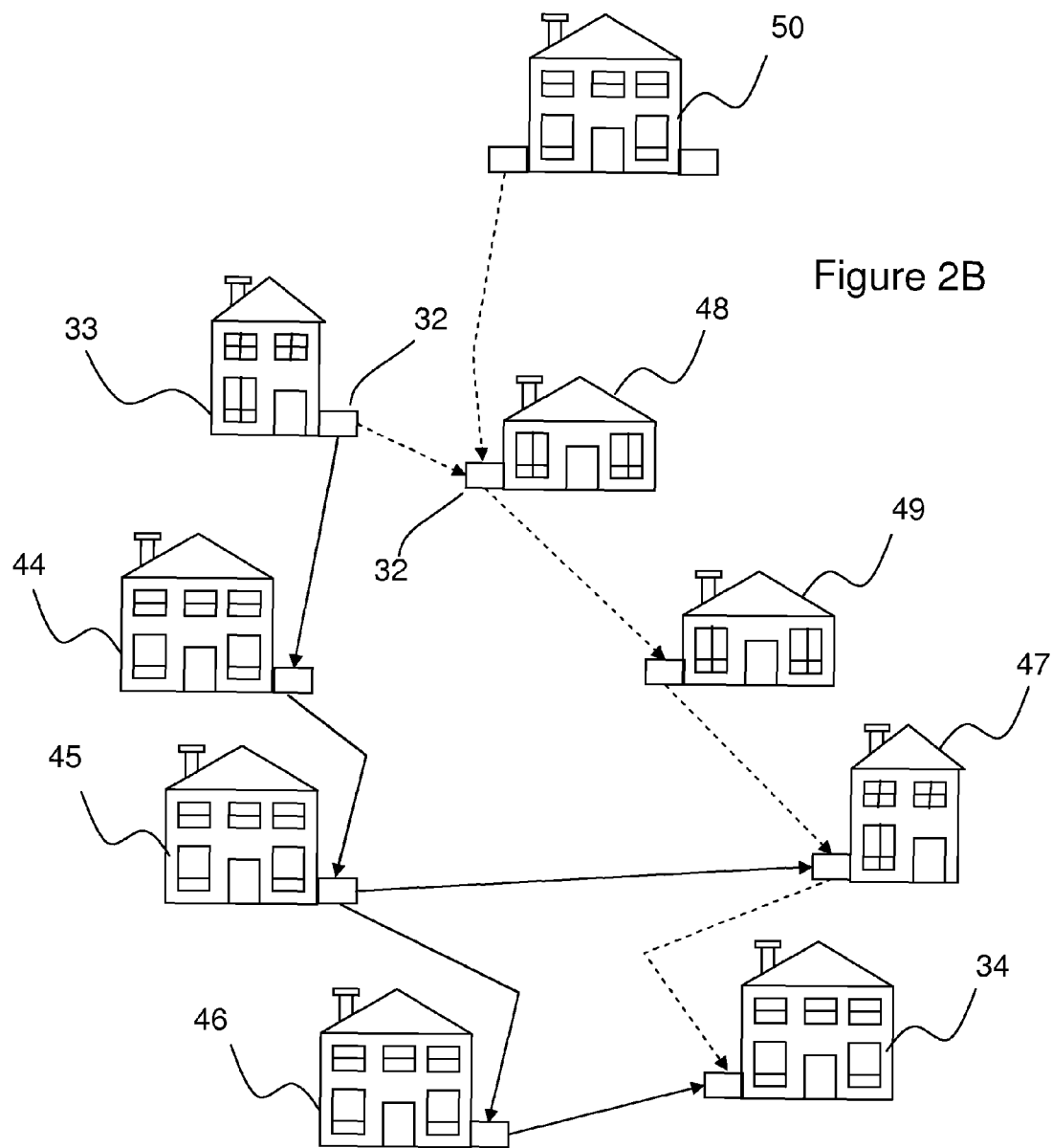
FIG. 2b is a simplified bloc diagram of a household consumption ad-hoc network when a node is added to the network of FIG. 1b.

For example, FIGS. 2a and 2b show such evolution of a HCMN when a node disappears as in FIG. 2a or is added as in FIG. 2b. The simplified HCMN shown in FIG. 2a is similar to the HCMN as in FIG. 1b with the exception that the house 49 is no longer part of the network; the HCM attached to house 49 has stopped transmitting a contact signal. The fact that house 49 has disappeared from the ad-hoc network does not affect the transmission and reception of data of the other communication nodes of the network. Having such ad-hoc network relationship offers alternate paths for the signals to propagate from a source house to a remote destination.

In the present example, when the HCM of node 48 transmits a signal indicative of the water consumption in response to a request received from the central station, the direct path, from node 48 to node 49 to node 47 and then to the central station 34, for propagating such signal is not available because node 49 is no longer a functional node of the ad-hoc network. Therefore, the signal is propagated through another path, represented here by nodes 33, 44, 45, 46 and/or 47 before reaching the central station 34, or through any of a plurality of other paths.

Referring to FIG. 2b, house 50 has recently been built in the neighborhood and is equipped with a HCM that is in transmission/reception range of the HCM of house 48. Therefore, without installing any costly equipment for connecting house 50 to a household consumption network, the HCM attached to house 50 transmits HCMV to the central station 34 and receives requests from the central station through the wireless ad-hoc network.

Figure 3:
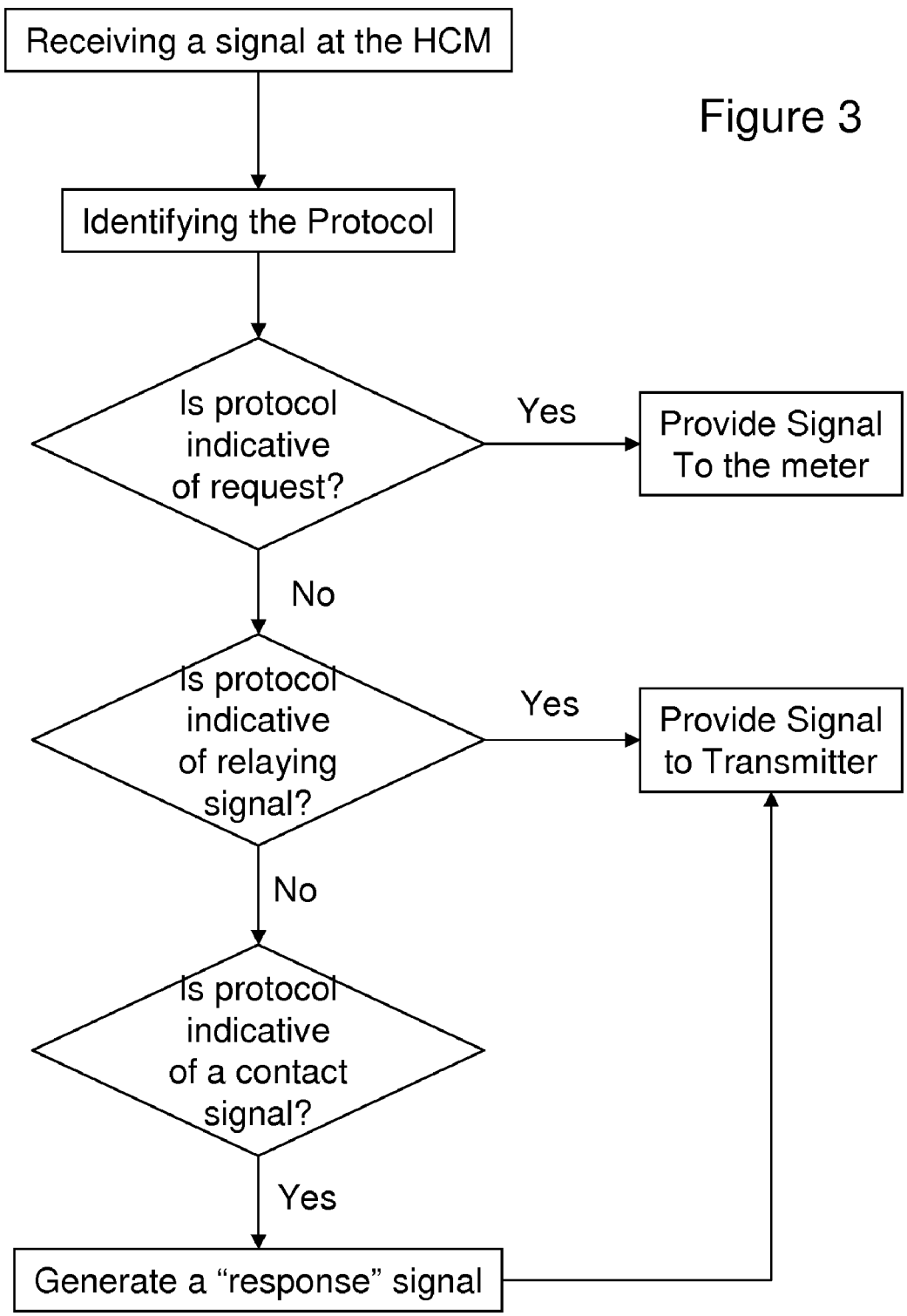
FIG. 3 is a flow chart diagram of a method of routing signals at the household consumption node.

Referring to FIG. 3, a flow chart diagram of a method of routing signals at the HCM is shown. Every signal received by the receiver included in the HCM includes a protocol, which permits routing the signal in accordance with the predetermined protocol. Therefore, upon the reception of a signal, the protocol is identified using identification steps. Upon the indication extracted from the protocol, the signal is routed to the meter when the identified protocol indicates that the signal is a request to read a household consumption to which the HCM is attached. When the protocol indicates that the signal is to be relayed, the signal is routed to the transmitter, which transmits the signal allowing the signal to propagate from one node to another node of the ad-hoc network.

Of course, the signals received from the central station are not limited to requests to read the meter; the central station periodically transmits signals having a protocol indicative of a contact signal. Interestingly, such contact signal provides information on the functionality of the HCM of the network when each HCM generates a message identifying itself to be propagated back to the station in response to the contact signal. Furthermore, a response is indicative of the number of consumption meters expected to return consumption values upon request. The central station reacts accordingly by scheduling the transmission of the request signals for each house.

Optionally, the signal generated in response to a contact signal identifying the source of the response includes data indicating whether the HCM is in need of maintenance.

Of course, standards could be imposed within the HCMN in order to facilitate communicating with other HCMNs.

Typically water meter readings, for example, are performed every few months and therefore the HCMN will have times when it is not being used, or when traffic within the HCMN is at a minimum. Conversely, a plurality of countries has deregulated the electricity distribution, and the users are charged on the current demand and specific hours basis. The peak consumption period when the demand for current and the price of electricity are higher is comprised between 7 am and 9 pm. Typically, a utility company is using an average price to charge the customers and the HCM are monitored such that each customer is charged in dependence upon their own averaged consumption.

According to another embodiment, the communication nodes are equipped with transducer for generating security signals in response to household security monitoring and the data transmitted through the network correspond to household security monitoring data.

In order to protect their home and family, people often keep guard dogs. Others use sophisticated security systems. Some security systems merely make a loud noise to deter intruders while others place a telephone call to a remote location. Presently, houses are typically equipped with security systems to monitor household security. In order for the security company to minimize the amount of time spent taking security readings they are connected via the phone lines to each monitored home. Such a system is costly to monitor and often far more complex than a residential home security would warrant.

Figure 4:
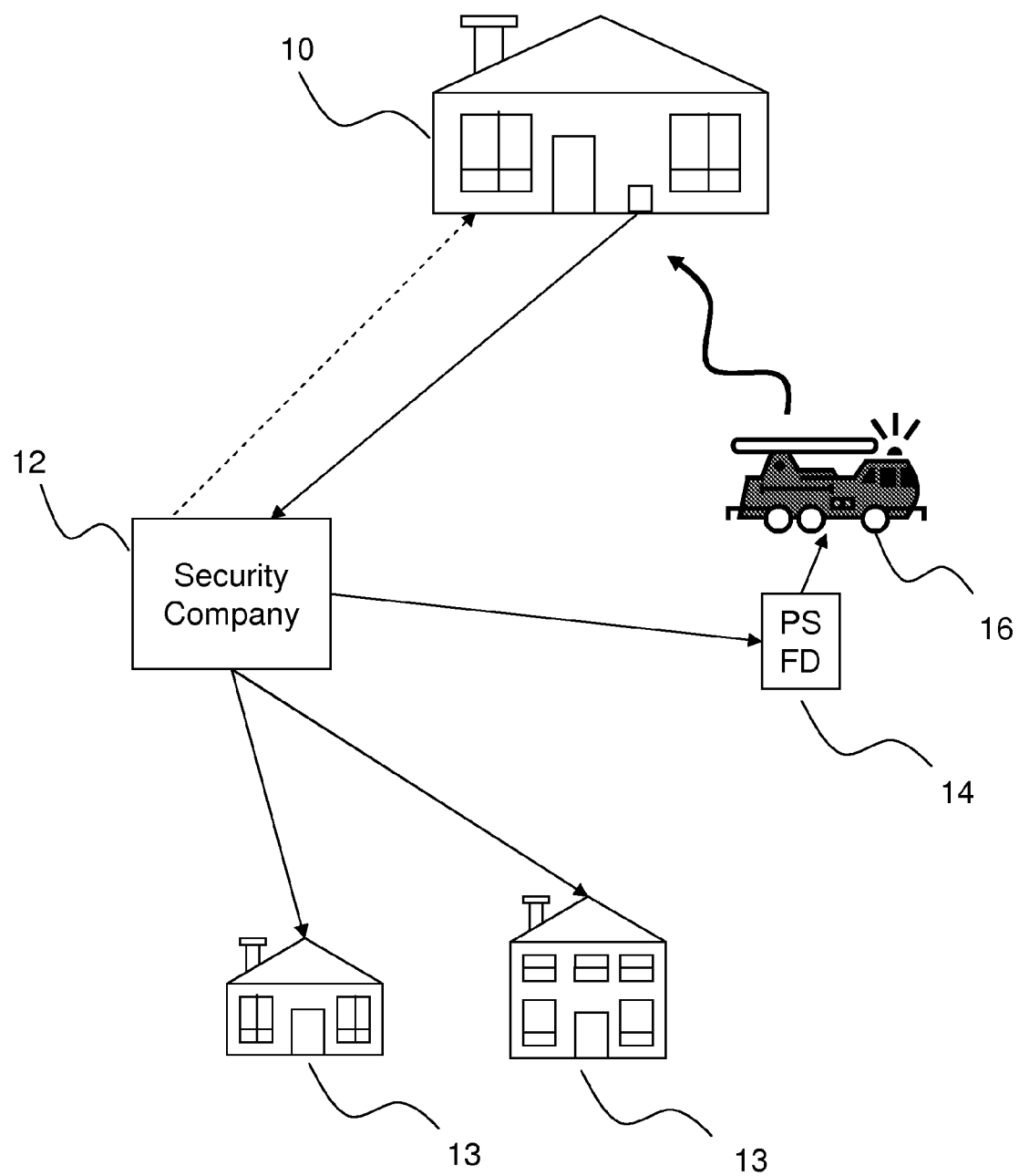
FIG. 4 is a simplified bloc diagram of a prior art household security system related to a central security company.

Referring to FIG. 4, a simplified bloc diagram of a prior art household security system related to a central security company is shown. In order to monitor a house 10, the house is equipped with various household security devices as for example main and back doors and bay-window contact devices, motion detector devices, smoke detectors, a siren. Each of the household security devices is related to a control panel generally located close to the main house door to facilitate activation and deactivation of the security system when leaving or entering the house. Of course, when installed, the smoke detector should only be deactivated under special circumstances such as maintenance. The house 10 is related to a security company 12 through telephone communication lines; the security company constantly monitors the house. When the security system of the house is activated and an intruder gains access inside the house, the alarm goes off, which alerts the security company. The security company tries to communicate by phone with the owner of the house in order to ensure that this is not a false alarm. Moreover, the company also tries to contact at least two other persons 13 named as references by the owner of the house. When it becomes evident that the alarm has not falsely initiated or that the contacts are not reachable, the police station 14 or the fire department is alerted, and a patrol car 16 is sent to the house for further enquiry. Of course, depending on the distance the patrol car 16 has to travel, the time to reach the house varies, which may increase damage caused by the intruders or by the situation.

Even though this is not an ideal situation, it is nonetheless an excellent protection system for countless houses and businesses. However, it is also an expensive system and has a monthly charge relating to monitoring thereof. As is apparent to a person with skill in the art, typical security systems present lots of drawbacks as for example the time response before an intervention, the costs associated with the whole installation and the constant monitoring and so forth.

Figure 5A:
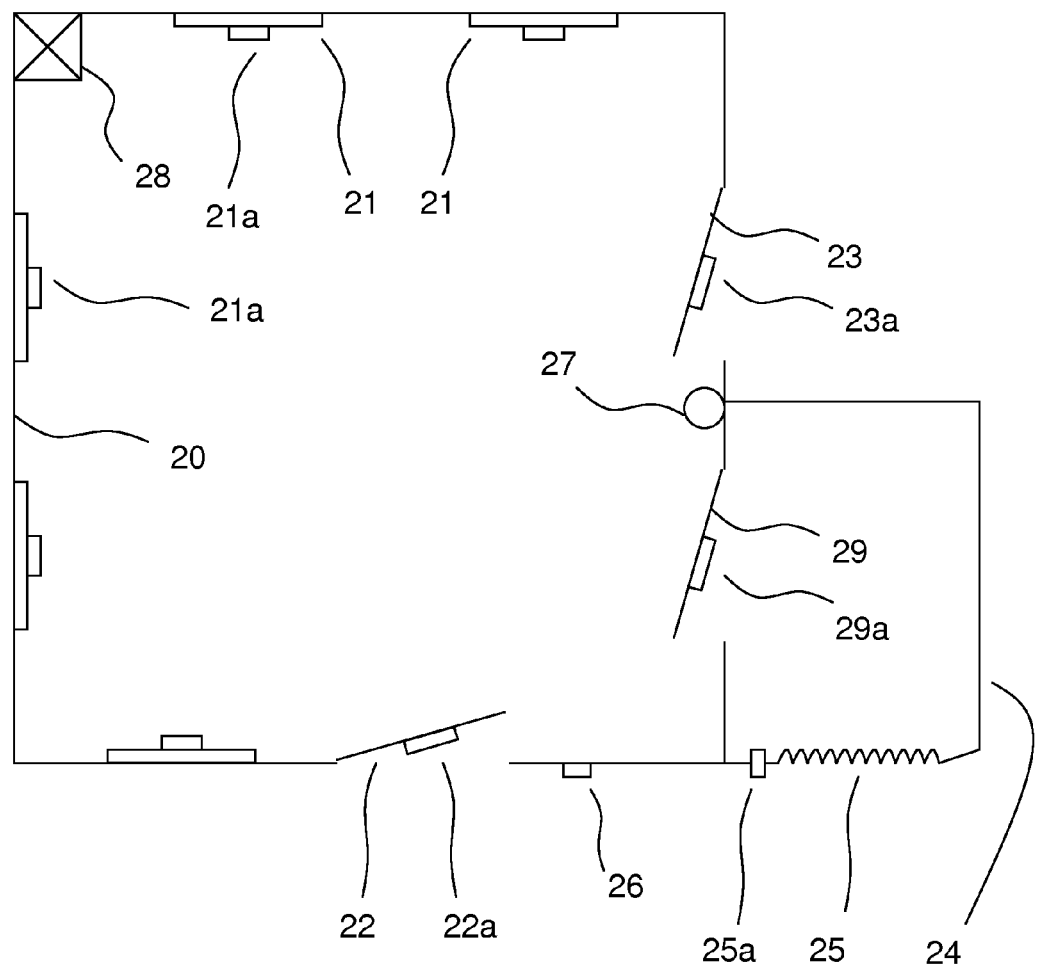
FIG. 5a is a simplified diagram of a household security system.

Referring to FIG. 5*a*, a simplified diagram of a household security system for use with an ad-hoc wireless communication network according to an embodiment of the present invention is shown. The household security system of the house 20 includes a plurality of windows 21, a front door 22, a backdoor 23, a garage 24 having a large retractable door 25 and a door 29 allowing an indoor path between the house 20 and the garage 24. The plurality of openings, i.e. windows 21 and doors 22, 23, 25 and 29 are each equipped with a contact detector 21*a*, 22*a*, 23*a*, 25*a* and 29*a*, respectively. The interior of the house is equipped with a smoke detector 27 and a motion detector 28, preferably compatible with having a pet moving inside the house without setting an alarm off. A bell 26 is preferably installed proximate the main door 22. Each item of the security system is equipped with a transmitter (Tx) and a receiver (Rx) for transmitting and receiving wireless signals to another household security device of the like. Typically, such a transceiver is part of the security items of the houses of a neighborhood. Having an individual house is not a requirement for installing such security items; they are installable in the apartments of an apartment building, automobiles, bicycles, etc.

Figure 5B:
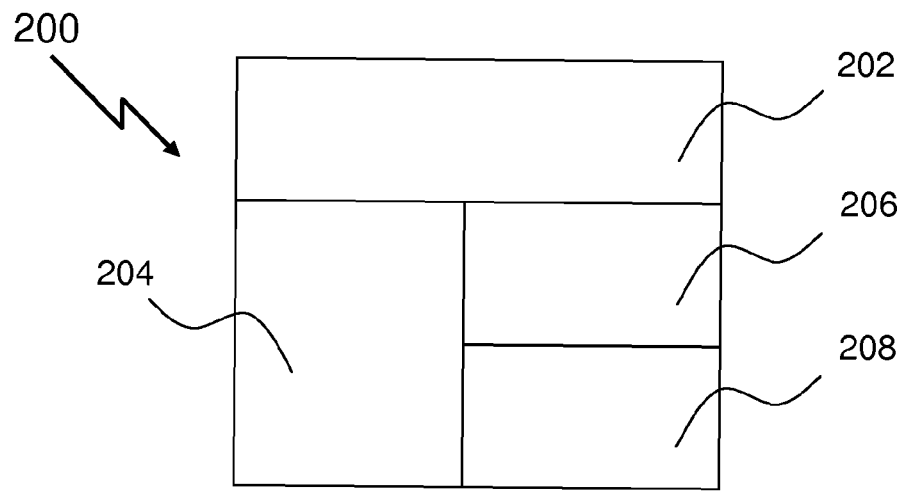
FIG. 5b is a simplified bloc diagram of a security item from the security system for use with an ad-hoc wireless communication network.

Referring to FIG. 5*b*, a simplified bloc diagram of a security item from the security system for use with an ad-hoc wireless communication network according to an embodiment of the present invention is shown. A security item 200 comprises a transducer 202 for example a contact detector, smoke detector, motion detector or the like. The transducer 202 generates a signal in response to an external signal. The transducer is in communication with a receiver 206 which received such signal. The receiver 206 also receives wireless signals from other devices as for example a portable security communication device shown in FIG. 7. Protocol data is attached to each signal, the protocol data for example allows for identifying the location and type of the security item. The receiver 206 is in communication with a processor 204, which identifies the wireless signals in accordance with the protocol used in connection with the wireless ad-hoc security network. For example, different sensors produce signals with different data allowing for distinction between fire alarm data, flood data, and security perimeter breach data. The security item also comprises a transmitter 208 in communication with the processor 204 for transmitting wireless signals for being relayed by other transceivers until the transmitted wireless signals reach a remote destination determined in accordance with the protocol.

Figure 5C:
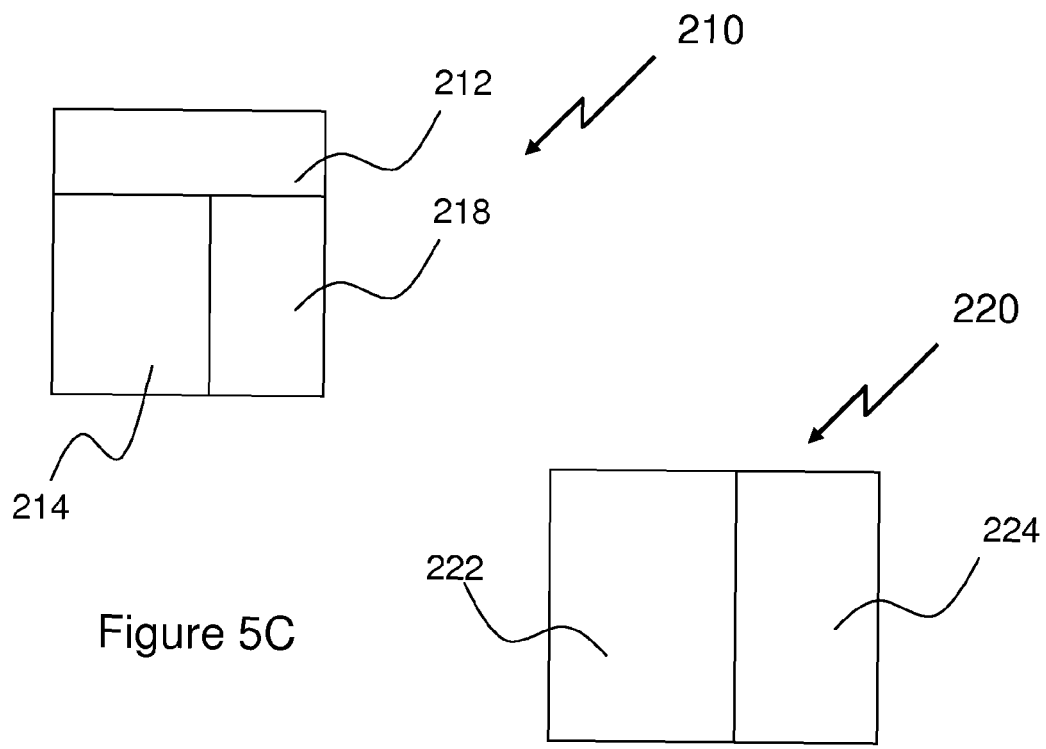
FIG. 5c is a simplified bloc diagram of an alternative embodiment of a security item from the security system for use with an ad-hoc wireless communication network.

Referring to FIG. 5*c*, a simplified bloc diagram of an alternative embodiment of a security item from the security system for use with an ad-hoc wireless communication network is shown. A security item 210 comprises a transducer 212 for example a contact detector, smoke detector, motion detector or the like. The transducer 212 generates a signal in response to an external signal. The transducer is in communication with a processor 214 that attaches protocol data to the signal generated by the transducer, the attached protocol data being in accordance with the protocol of the wireless ad-hoc security network. The security item also comprises a transmitter 218 in communication with the processor 214 for wirelessly transmitting signals to a smart box 220. The smart box comprises a transceiver 222, which is in communication with a processor 224. The transceiver 222 includes a receiver and a transmitter, the receiver is for receiving a signal from the security items 210; the signal is communicated to the processor 214 that completes the identification of the signal by inserting protocol data in reference to a propagation of a signal through the ad-hoc network. Then, the signal having protocol data embedded therein is provided to the transmitter for a propagation of the signal through the network.

Optionally, the network is a self-configuring network. Changes in network topology are accounted for by sending an initialisation signal through the network, which incorporates the changes and reconfigures accordingly.

Figure 6:
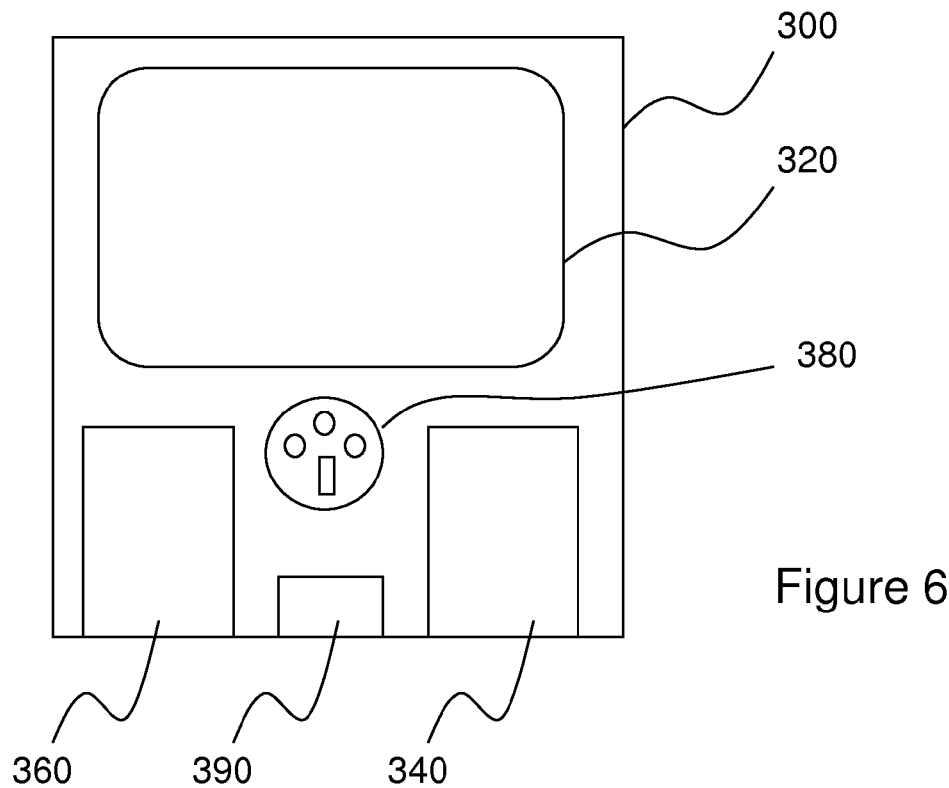
FIG. 6 is a simplified bloc diagram of a security control panel for use with the wireless security as-hoc network according to an embodiment of the present invention.

Referring to FIG. 6, a simplified bloc diagram of an embodiment of a security control panel for use with the wireless security ad-hoc network according to another embodiment of the present invention is shown. The security control panel 300 is in communication with the plurality of security devices inside the house and the control panel comprises a display screen 320 for displaying which of the security item(s) is transmitting a signal, which is activated, or which are deactivated. The security control panel also includes a transceiver 360 for receiving and transmitting signals according to their attached protocol data through the wireless security ad-hoc network and a processor 340 in communication with the display and the transceiver, the processor is for identifying the protocol data attached to a received signal and for generating signals to be transmitted in accordance with the security ad-hoc network protocol.

The control panel also includes a switch 380 for selecting between security options. Depending on the position of the switch, the household security system is programmed such that a signal is wirelessly transmitted from communication nodes to other communication nodes in accordance with a security ad-hoc network protocol, destined for a predetermined device.

Optionally, the control panel is in communication with the smart box, which receives the signals from the security items, and the control panel is used to propagate security signals through the ad-hoc network. Alternatively, the smart box and the control panel are set to regularly communicate with each other by emitting a wireless signal in the form, for example, of an acknowledgement signal sent by the smart box to the control panel such that the receiving party generates an automatic response to the message. Therefore, in case of malfunction of the control panel, the control panel does not generate an automatic reply to the acknowledgement signal; this automatically results in the smart box assuming a primary position.

A convenient location of the control panel is close to the main door; it is easy from there to turn the switch in the appropriate position just before leaving the house. However, it is also one of the first triggers of intruders who try to disconnect the alarm or even destroy the panel. Such destruction is often a fast process. Advantageously, the smart box is locatable anywhere in the house, and in case of destruction of the panel, the smart box takes over and becomes the source of propagated signals. Of course, the smart box is not a necessity and the control panel is optionally put in a location for preventing inadvertent damage or deliberate damage caused by an intruder.

A security item within a household, which belongs to the ad-hoc security network, is set to monitor security and to transmit a signal indicative of a security breach via the ad-hoc security network. The security device transmits a signal at a predetermined frequency using a predetermined protocol, providing its data to other nodes within the ad-hoc security network that are within a known range of the security device. The security monitoring data from the security monitor propagates through the wireless network from node to node until it reaches a destination node—typically an on-duty neighbour or a trusted neighbour. At the destination node, the control panel indicates which security item has transmitted the signal. For example, the security item is identified by address, floor, and sensor type. At the destination node the value obtained from the network is noted and is preferably acted upon.

A first option is for example labelled "out" which is a position of the switch selected when the user leaves the house for a remote location. In this state, the pre-programmed frequency of the household security device is set such that in case of break-in, a signal having a pre-determined protocol is generated and transmitted from the security items throughout the ad-hoc network and the signal propagates from transceiver to transceiver until it reaches and alerts the on-duty neighbour or a trusted neighbour.

A second option of the switch is labelled for example "Home-out" which indicates that the owner is home but is in the garden, in the backyard or in the garage. In this state, the pre-programmed frequency of the household security device is set such that the user is alerted. Therefore, when the user is outside gardening for example and the bell rings, the user is notified by receiving a signal on a communication security device in the form for example of a vibration or an audio signal. Similarly, if the smoke detector detects smoke, the control panel notifies the user by transmitting a message indicative of such. Optionally, the closest fire department is also notified through the ad-hoc wireless communication system transmitting a signal having a specific frequency destined to the fire department. Of course, though the selection of frequency is disclosed above, it is a straightforward matter to implement the distinction using different protocol data within a same ad-hoc network.

A third position of the switch is labelled for example "Home-in" which indicates that the owner is home and inside the house. In this state, the control panel is set such that only the smoke sensor is activated. Optionally, other security devices other than a motion detector are also activated. Of course, in this case, if the user opens a door equipped with a contact device in communication with the household security system through the control panel, an alarm goes off in response to the door opening.

Preferably, the control panel is configurable such that security devices are activated or deactivated upon a choice of the user.

Preferably, when a user is home, a further option is to deactivate the transmission of any signal via the security ad-hoc network outside the home and more specifically to the on-duty neighbour or trusted neighbour. However, this is not a requirement and someone might feel safer to know that if something happens, a signal is transmitted through the security ad-hoc network to this trusted neighbour and an appropriate action would be initiated.

Another position of the switch corresponds to the "on-duty" position where the control panel is set to receive signals from any household security device from the neighborhood through the wireless security ad-hoc network.

Alternatively, to limit the amount of signals transmitted when a break-in occurs in a house, all the security features are set to communicate and send security signals to the control panel. Only the control panel transmits a signal using the wireless security ad-hoc network. For example, if someone breaks a door to enter into a house, the contact detector attached to the door emits a signal indicative of a rupture of contact; the individual entering activates the motion detector, which also emits a signal indicative of a detected movement. Both detectors transmit their signal to the transceiver of the control panel such that the processor therein generates a unique message including data indicative of the two detector signals such that only one message propagates through the ad-hoc network. Of course, it is a straightforward matter to have the ad-hoc network protocol support this two stage data transmission methodology. For example, data is encoded within the sensor message indicating that the destination node is known to be within transmission range and, as such, no relaying of that message is required. Of course, it is a straightforward matter to build sensors supporting both local and non-local transmission of signals and, thereby increase flexibility and reduce bandwidth bottlenecks within the security ad-hoc network.

Preferably, the control panel is equipped with an alarm generator in the form for example of a speaker for emitting an audio alarm when the control panel receives a signal indicative of a security breach within the house and/or within the neighborhood.

Having a security system for use with a wireless communication system through an ad-hoc network provides tremendous flexibility. Therefore, security items are removable, movable and/or insertable according to the choice of the user and for a nominal cost. Indeed, when a user decides for example to add a garden house for storing tools, the entrances to the garden house are optionally equipped with similar security items in wireless communication with the ad-hoc security network. Further, it is possible to equip vehicles with similar household security devices to, for example, measure wheel motion. As such, bicycles, cars, go-carts, wheelbarrows, etc. are secured and their movement results in an alarm. This is highly advantageous for many individuals who store valuable items such as these in their garden house.

Figure 7:
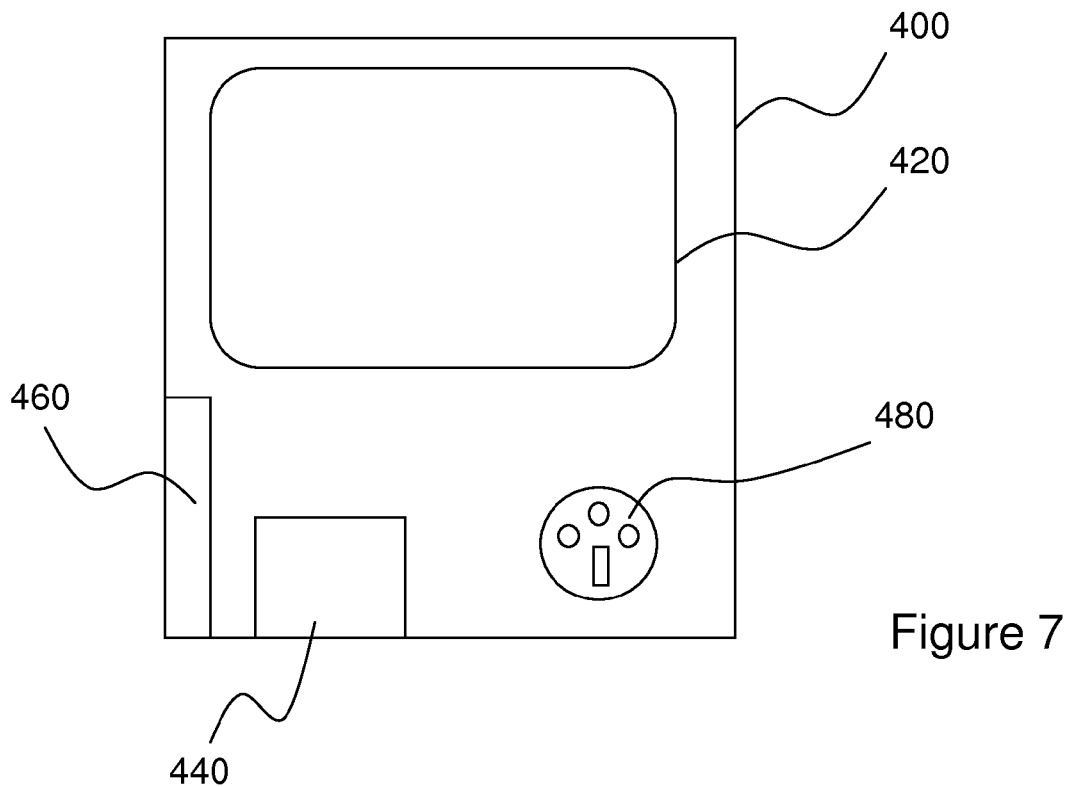
FIG. 7 is a simplified bloc diagram of a portable security communication device for use with the wireless security as-hoc network according to an embodiment of the present invention.

Referring to FIG. 7, a simplified bloc diagram of a portable security communication device for use with the wireless security ad-hoc network according to another embodiment of the present invention is shown. The security communication device in the form for example of a pocket sized device 400, is in wireless communication through the ad-hoc security network with each security item installed in the house of the user carrying the communication device. The security communication device comprises a display screen 420 for displaying any of the security items transmitting a signal or which is activated or which is deactivated. The security communication device also includes a transceiver 460 for receiving and transmitting signals according to a predetermined protocol through the wireless security ad-hoc network and a processor 440 in communication with the display and the transceiver, the processor for identifying the protocol data attached to a received signal and for generating signals to be transmitted in accordance with the security ad-hoc network protocol.

Optionally, the communication device comprises a switch 480 for selecting between options as for example an option labelled "home-out" where the communication device is in communication with the control panel, which is also set in a similar position. Therefore, if an individual is ringing the outside bell and the owner has set the inside panel to indicate that he is out but in the vicinity as for example in his backyard, a signal indicative of the bell ringing is communicated to the wireless security device which identifies the protocol and propagates the signal to a communication device that the owner carries with himself. The individual in his backyard is thus notified that someone is visiting him and is waiting at the main door.

Optionally, the owner has established a two-way wireless communication link with the person who rang the bell.

Another option permits communicating with a plurality of household devices in a range as for example, furnace and lights. The thermostat is programmable and the temperature can be set using the communication device communicating through the wireless ad-hoc network with the thermostat. This is advantageous when a user is leaving his house for a few days and when on his way to the airport he suddenly remembers that the thermostat is set to maintained a temperature comfortable when he is in the house but too high when the house is not occupied. Similarly, the light switches are programmable such that certain lights are turned on or off depending on the time of the day to mimic a presence inside the house.

Nowadays, a large proportion of the population has a pet at home and motion detectors that are pet sensitive such that a dog walking in the house does not trigger the motion detector are available for conventional alarm systems. Therefore, when the user leaves the house for a few days with the pet, it is advantageous to be able to deactivate the "pet sensitive" option of the motion detector to prevent an eventual use of trained animal to break in.

In another embodiment of the present invention, a transmitter and a receiver are disposed within each security device within each home. Typically within a neighborhood there are a plurality of houses within close proximity of each other, where each of these houses has a security system installed therein for monitoring of the house. The security systems communicate on a predetermined frequency using a predetermined protocol.

Of course, the transmission or reception of a security signal through the ad-hoc wireless communication system is not supported by existing telephone lines, which are often a first target for robbers who generally try to cut off all wired communication media. For example, if someone breaks into a house, security data are transmitted through the ad-hoc network according to a predetermined protocol corresponding to the transmission of such data toward a specific destination; here the on-duty or trusted neighbour. The transceivers located in the neighbour houses relay the security data signal until reaching the on-duty neighbour.

Figure 8:
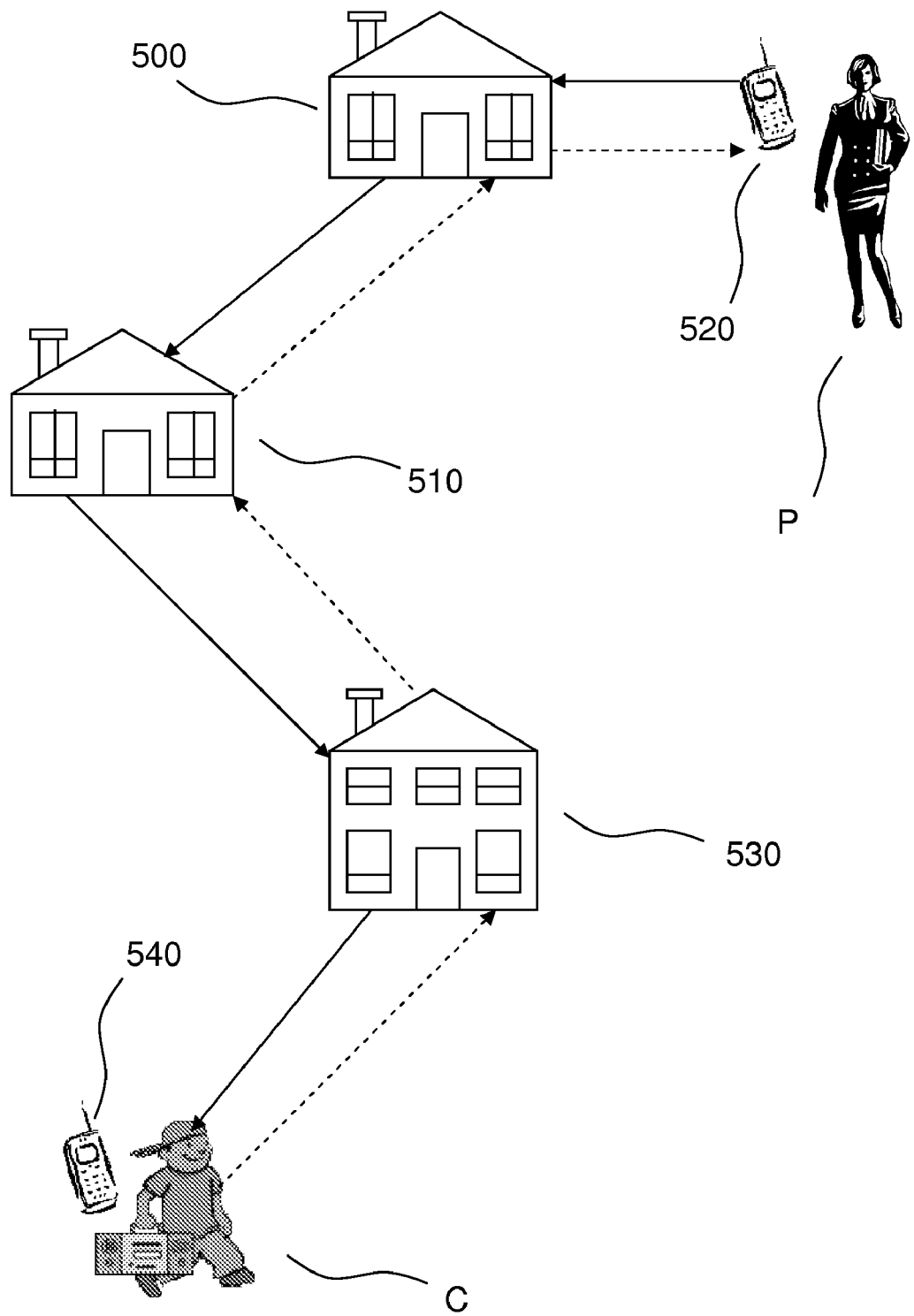
FIG. 8 is another form of data being transmitted using transceivers within the network according to another embodiment of the present invention.

Referring to FIG. 8, another form of data transmission using transmitters and receivers within the network according to another embodiment of the present invention is shown. Typically, children living within the ad-hoc network have an image and text display communication device 540, in the form of a watch worn on a wrist. Parent P has their communication device 520, parent P of the children C sends message to their children using their communication device 52 as part of the network. The message propagates from a first node 500 to a further node 510 and to another node 530, and so on, until it reaches the communication device of child C. Of course the frequency channels used for communication between communication devices, or communication devices and nodes within the network is determined in accordance with the predetermined protocol. This protocol allows for selecting a single recipient to communicate with within the network, as well as offering broadcast capabilities, where information is broadcastable to a number of communication devices within the network. Advantageously, the parent P is able to locate a child without sending a written message. When a signal from the communication device of the parent P has reached its destination, i.e. when the protocol attached to the transmitted message matches the identity of the communication device of the child C; the communication device of the child automatically sends a return message having protocol data therein identifying the parent communication device. By appending data to the message at each relay point, localization of the child is possible. As such, upon the reply message reaching the parent communication device, the parent locates the child in the neighborhood.

To reach the communication device 540 of the child, the signal has propagated from node 500, to node 510 and then to node 530. The return message from the child communication device 540 to the parent communication device 520 is shown to propagate using the same nodes in a reverse path. However, in a neighborhood, the nodes are in close proximity to each other, which provides for alternate paths for propagating the wireless signals. Advantageously, as long as the child is within the propagation range of the wireless ad-hoc network, the child is locatable by their parent. Further advantageously, the communication device is programmable such that it periodically transmits a signal to the parent communication device for the parent to always know where the child is located anytime.

Alternatively, the child device includes a location detector therein and the reply message includes the detected location. For example, a GPS system is incorporated within the child device to identify the child's exact location. When the parent device includes appropriate mapping software, the parent is informed of the child's location in easily comprehensible terms.

Figure 9:
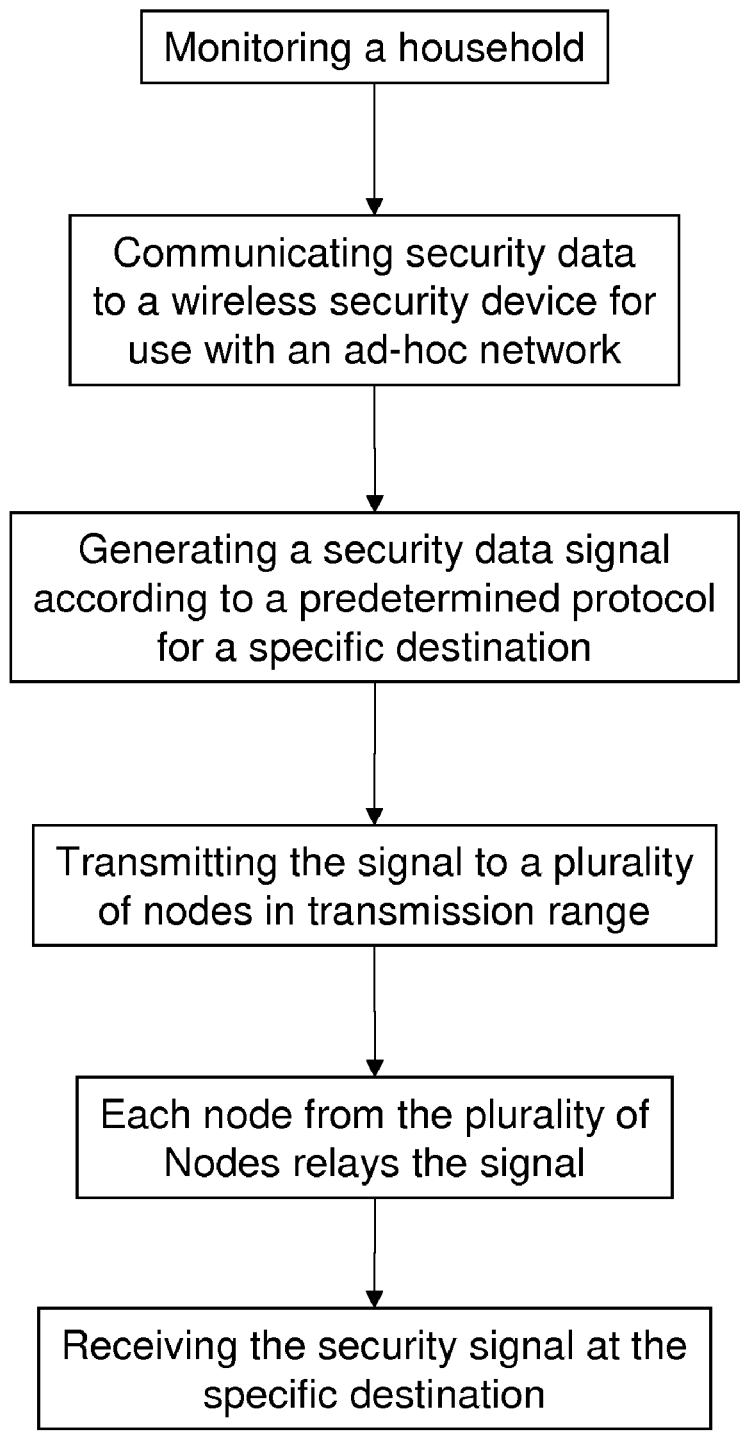
FIG. 9 is a flow chart diagram of a method of propagating security data through an ad-hoc network according to an embodiment of the present invention.

Referring to FIG. 9, a flow chart diagram of a method of propagating security data through an ad-hoc network according to an embodiment of the present invention is shown. A house is monitored using typical security features in communication with the wireless security ad-hoc network. Upon sensing an intrusion inside the house, the security features generate a security data signal according to predetermined protocol associated with a specific destination. The predetermined protocol identifies the source of the signal and the destination of the signal.

Of course, a security data signal may originate from any house. Therefore, each security items is a potential source of security data signal as well as a relay in the propagation of a security data signal originated from another security item. As such, each node is also a receiver for receiving such signal and a transmitter for broadcasting the signal.

Figure 10:
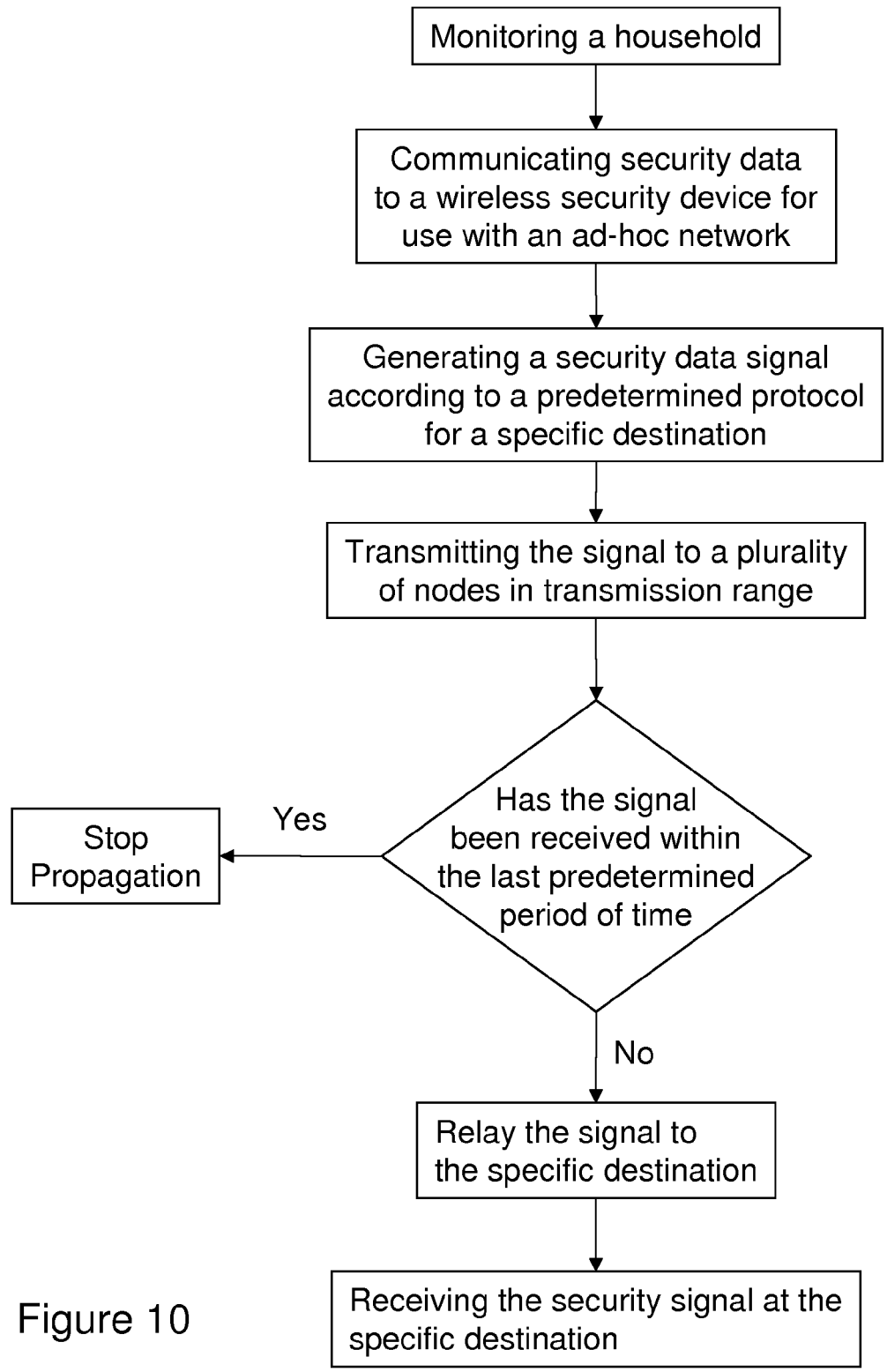
FIG. 10 is a flow chart diagram of a method of propagating security data through an ad-hoc network according to another embodiment of the present invention.

Referring to FIG. 10, a flow chart diagram of a method of propagating security data through an ad-hoc network according to an embodiment of the present invention is shown. A house is monitored using typical security features in communication with the wireless security ad-hoc network. Upon sensing an intrusion inside the house, the household security device generates a security data signal according to predetermined protocol associated with a specific destination. The predetermined protocol identifies the source of the signal and the destination of the signal.

Once generated, the security data signal propagates from one node to another node. The dynamic aspect of an ad-hoc network renders the configuration of the network flexible because sometimes nodes appear and are added to the network or nodes disappear and are removed from the network. Therefore, when a security signal is generated at one node, the signal propagates through at least one path towards the remote destination. However, some nodes are in the transmission range of a plurality of security features and eventually receive a signal originating from the same source many times, the signal being transmitted through different paths. Therefore, the security devices verify whether a security data signal having a predetermined protocol destined to a specific location and originating from a specific location has already been relayed within the last predetermined period of time. When it is determined that the signal was transmitted within the last predetermined period of time, the latest received signal is stopped. When it is determined that the signal was not previously transmitted, it propagates within the transmission range of the node and is eventually received by another node, which performs similar verifications. The message propagates through the network and is received at the remote destination.

Advantageously, performing such verification at each node limits the number of security data signal received at the destination node. Of course, when the security device equipping the on-duty or trusted neighbour receives a security data signal, an appropriate action is taken by telephoning to the police station or ambulance or fire department in dependence upon the type of security signal received.

Though the above ad-hoc network is described with a semi-fixed topology, this need not be the case for the protocol used and is merely exemplary of an ad-hoc protocol for dynamic network configuration, reconfiguration, and mapping. It is possible to implement the inventive network without initial transmissions to allow network re-configuration by using an un-configured form of ad-hoc network whose protocol assumes other than static situations at each node.

In the previous embodiments, the ad-hoc network communication was supported in part by static communication nodes, which defined an organized infrastructure network in order to achieve the various functions of the transducers, i.e. security monitoring or meter readings functions. Of course, there is no limitation as of the use of static communication nodes when the communication nodes are equipped with transducer; it is however a preferred option.

In another embodiment, the communication node for use with a wireless ad-hoc network does not include a transducer. Such communication nodes are preferred for use with a less structured network with virtually no infrastructure and allow for being used with expanding and contracting networks. In this aspect, mobile communication nodes mostly support the propagation of signals. However, pseudo-static or static communication nodes are also used in wireless communication ad-hoc networks. Of course, communication nodes equipped with a transducer and communication nodes not equipped with transducer are not exclusive to each other within a network.

Figure 11:
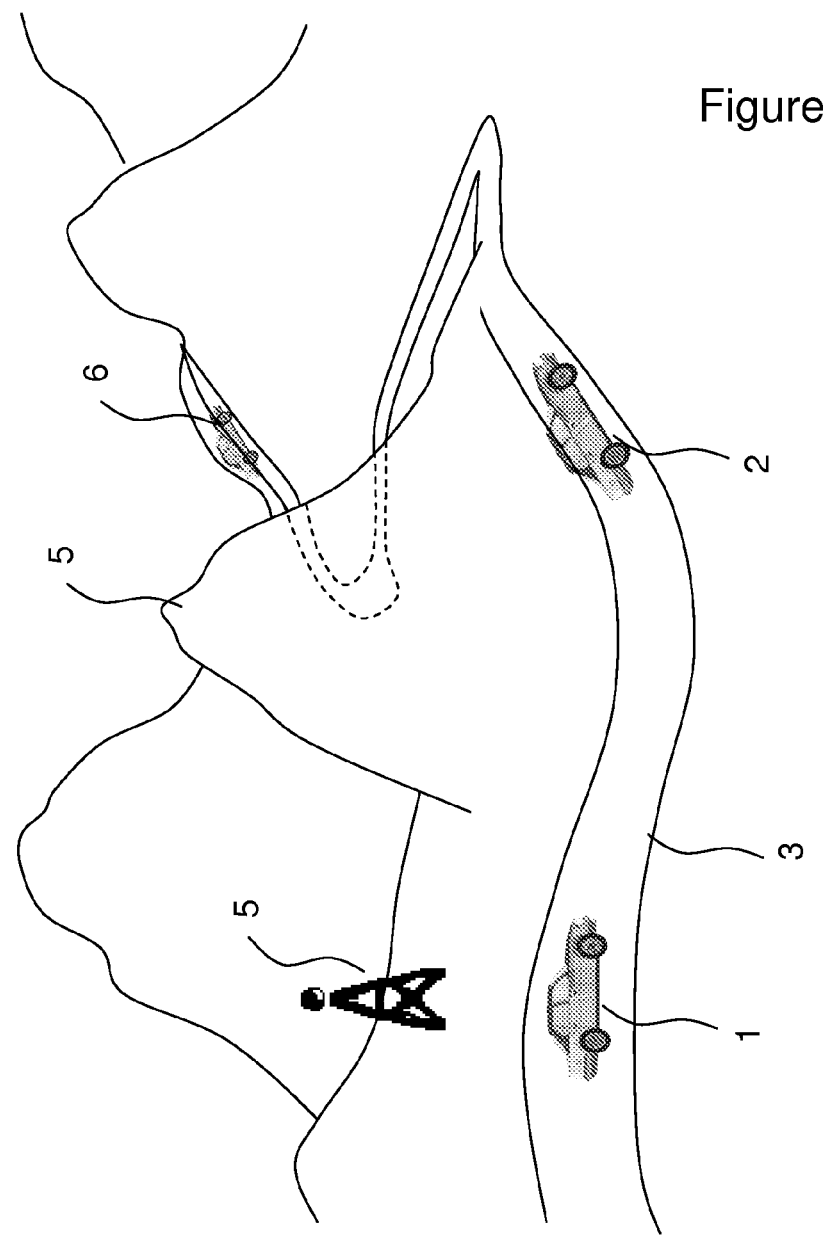
FIG. 11 is a schematic diagram of a prior art communication system used with cars.

Referring to FIG. 11, a schematic diagram of a prior art communication system used with cars is shown. Cars 1, 2 and 6 are heading in the same direction on road 3, the three cars travel together. For explanatory purpose, it is assumed that at least one individual within each car has a cellular phone. A tower 4 has been installed; therefore, the individuals in the cars are in communication one with the others by using the tower to allow the connection between them. When people are traveling together in separate cars, it is very convenient to be able to communicate especially when a problem is encountered by one the cars, or simply to communicate information as for example the menu in a specific restaurant or the location of police patrols on highways. Of course, if the car 6 has a flat, the driver stops the car to change the tire, the following cars will be aware of the incident by passing the car 6 shortly after the incident occurrence. However, if such an unforeseen incident happens with a last car 1 of a group, the front cars will not be aware of the situation unless someone in car 1 is able to communicate with the other cars.

The road 3 traverses a mountain region; the mountain 5 blocks the transmission of signals either telephone or CB signals. Car 6 is in a dead zone and is no longer contactable and car 2 is about to be un-reachable too. Of course, being in a dead zone implies that, for example, car 6 is not able to contact a tower in order to contact car 1 or car 2. Therefore, as long as the cars cross this mountain area and as long as an area on the other side of the mountain area is not appropriately towered, the cars remain out of contacting possibilities. Of course, the leading car can stop and wait for the other. However, not knowing how far behind the other cars are, often renders drivers impatient, and sometimes angry or worried. Clearly, if a car has a mechanical breakdown while in a dead zone, it will be unable to send a message using a conventional wireless communication system.

It is apparent to a person with skill in the art that similar limitations are encountered when another communication system is used such as for example CB radio. The geography identically blocks the radio transmission. An advantage perhaps exists on the other side of the mountain area because with such a system there is no need for infrastructure such as a tower. However, all the cars have to be out of the mountain's influence to be able to regain point to point communication.

Figure 12:
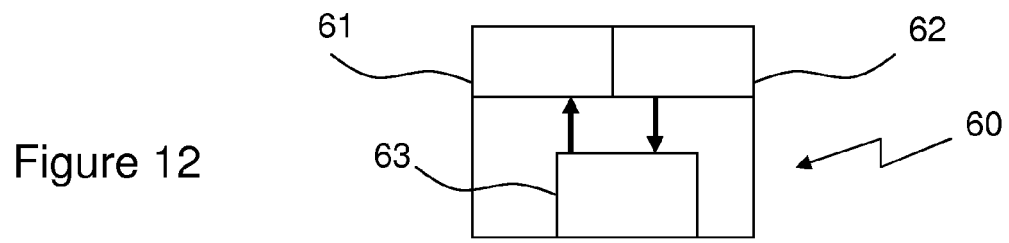
FIG. 12 is a simplified diagram of vehicle communication device for use with an ad-hoc wireless communication network according to an embodiment of the invention.

Referring to FIG. 12, a simplified diagram of a mobile communication device for use with an ad-hoc wireless communication network according to an embodiment is shown. The communication device 60 comprises a transmitter 61 and a receiver 62 for transceiving wireless signals. The communication device also includes a processor 63 in communication with the transmitter 61 and the receiver 62, the processor for identifying the wireless signals. Typically, such a communication device is located inside a vehicle. The communication device allows for short distance, low bandwidth Tx and Rx. In this manner information is exchangeable between vehicles allowing for network connectivity from one vehicle to another. In this case bandwidth is realized by the system when there are a large number of vehicles congregated in one area. For instance a wireless ad-hoc automobile network as such would be useable in rural areas where there are no cellular towers. Allowing for a limited form of communication between users without requiring the installation of expensive cellular towers and other associated wireless equipment.

Figure 13A:
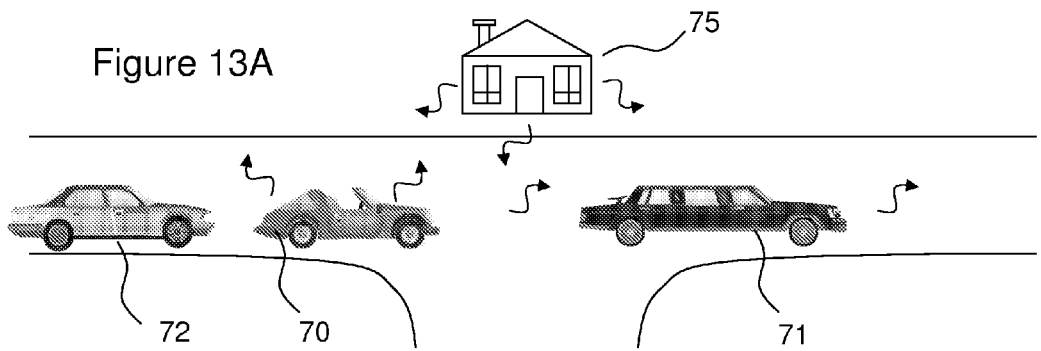
FIGS. 13a, 13b and 13c, are simplified diagrams of mobile ad-hoc wireless communication network for use with a plurality of mobile communication nodes; and, FIG. 14 is a simplified mobile ad-hoc network according to another embodiment.
Figure 13B:
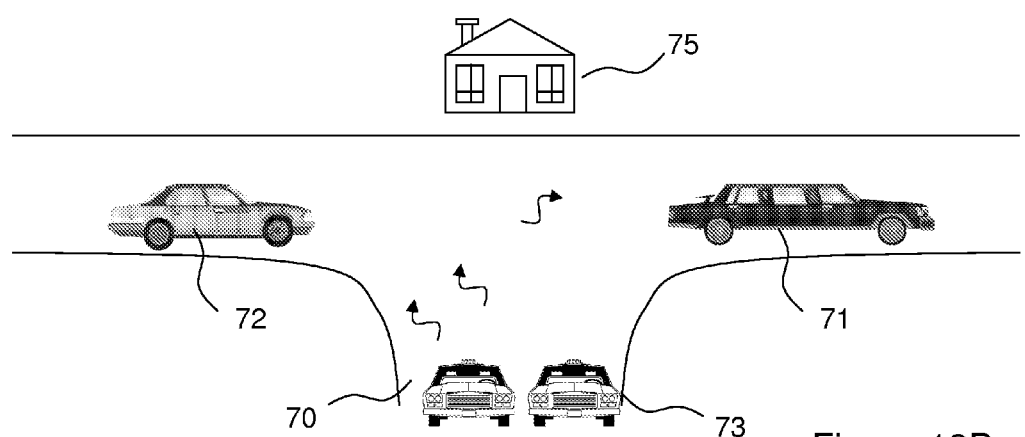
Figure 13C:
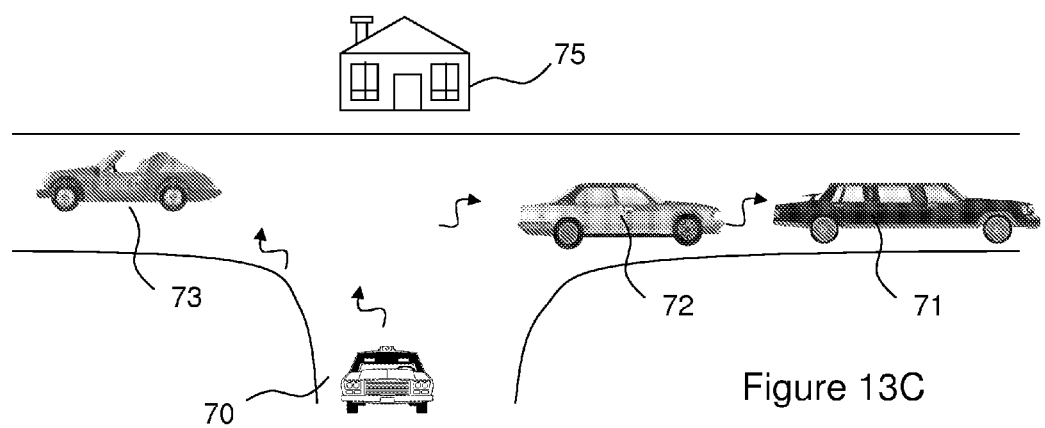

Referring to FIGS. 13a, 13b and 13c, simplified diagrams of mobile ad-hoc wireless communication networks for use with a plurality of mobile communication nodes are shown. The plurality of mobile communication nodes is in the form of cars for explanatory purpose, however, as is apparent to someone of skill in the art, vehicles are not the only mobile communication nodes for use with the ad-hoc network. Other mobile communication nodes as for example skiers or hikers are considered as mobile communication nodes as long as they are equipped with communication devices for use with such an ad-hoc network. A communication device of the type described in FIG. 12 is disposed within each of a plurality of mobile devices in the form of cars. Typically on the roads, there is a plurality of cars 71, 72 and 73 within close proximity of each other, where each of these cars has a transmitter and receiver installed within for supporting an ad-hoc network and its architecture. The transmitters and receivers communicate on a predetermined frequency using a predetermined ad-hoc networking protocol. Car 70 transmits data that wirelessly propagate and reach car 71 in the propagation range of car 71. The two cars exchange information directly as long as they are in their respective transmission range as shown in FIG. 13a. For example, vehicles could exchange music data, weather data, map data and so forth as they pass each other according to a predetermined protocol for use with an ad-hoc network. Alternatively, privacy is supported—a node optionally prevents data transmission. The protocol is varied depending on the vehicle status—started, idle, parked, in traffic, on highway, etc.

In FIG. 13b, car 71 is heading on the same road as car 70 in another direction. As they are moving apart, cars 70 and 71 are no longer in transmission range and the communication between the two cars is now supported by car 72, which is within the transmission range of the two cars and therefore relays communications.

In FIG. 13c, the distance between the vehicles has increased and the communication is performed using other nodes as for example car 73 that happens to be in transmission range of car 70 and car 72, which is still in communication range of car 71.

Typically the destination node is not within wireless proximity of the transmitting node. Therefore in order to obtain data from the transmitting node, the destination node uses the predetermined protocol to obtain the data when transmitted. Through the predetermined protocol the destination node communicates with any node within the network, using other nodes within the network to relay information in order to obtain data from any other vehicle so equipped.

Preferably, static or semi-static communication devices for use with wireless ad-hoc network also communicate with mobile communication devices. For example, in FIGS. 13a, b and c, the house 75, which is a static communication node, is equipped with a communication device in the form, for example of the communication device described in FIG. 1 or in FIG. 5. House 75 communicates data to the cars passing within transmission range. Interestingly, when house 75 is a store, the data broadcasted correspond to advertisements. Advantageously, the advertisement reach people in the close proximity of the store, which are the more likely to be interested and inclined to stop. A restaurant, for example, transmits data indicative of the menu, the prices, and the number of seats available, and so forth to the cars passing by. Preferably, these messages are not retransmitted beyond a predetermined distance or, alternatively, more than a predetermined number of hops.

Optionally, communication devices for use with a wireless ad-hoc communication network are strategically attached to signal panels or curve security rails for example. Therefore, these communication devices are useable as relays for propagating communication data. The communication device of the like previously described comprises a transmitter, a receiver and a processor. It is of particular interest if an accident occurs. An emergency signal can be propagated from the communication device equipping a vehicle, to a plurality of communication nodes until it reaches its destination. Of course, having a GPS inserted within the communication device facilitates the location and the rescue of the people having sent the emergency signal.

Similarly, a ski lift provides information regarding the traffic at the ski lift and an estimated time to wait before going up the mountain to the skiers having a communication device for use with an ad-hoc network. The information being propagated from one communication device to another communication device in the transmission range, the information "propagates" to remote location. Getting such information, i.e. advertisement or traffic data, facilitates the management of the time for example. When the ski lift informs the skiers that there is at least one waiting hour before being lifted, a skier may choose to go to the restaurant at the top of the mountain, which has just broadcasted that many seats are available on the terrace. Therefore, the skier will not experience frustration expecting a lift and waiting while hungry.

For example, informative data are transmittable to individuals while they are visiting National Parks. At their entrance in the Parks, visitors are given a communication device for receiving information along their visit as they go through the Park and eventually bringing to their attention a subject matter of interest, for example a rare specimen being observable in a specific area. Of course, the system is interactive and visitors communicate with the Park staff if necessary and with other people. Optionally, the communication device is equipped with a Global Positioning System (GPS), which allows for identifying a location of a visitor.

Advantageously, the communication devices are carried in ad out by individuals resulting in little or no disruption to the parks natural beauty. Further, in common locations where tourists—the less expert at orienteering—are located, there is likely to be a larger density of people so as to facilitate ad-hoc network formation and use.

Optionally, considering the large surface and the relief of the parks, communication devices for use with a wireless ad-hoc communication network are attached to trees in a manner that is not harmful to the tree. Though this is not a preferred option considering the large amount of communication devices that are necessary to provide broad coverage, and the maintenance of such devices, they are useable as relays for propagating communication data to and from very specific locations within the park. The communication device comprises a transmitter, a receiver and a protocol processor. It is of particular interest if an accident occurs. An emergency signal is then propagated from the communication device provided to the visitor, to a plurality of relay devices until it reaches its destination. Of course, having a GPS inserted within the communication device facilitates the location and the rescue of the people having sent the emergency signal.

Optionally, communication devices are given to park rangers and the transmission range of the devices is set to cover a larger proportion of the park than those given to tourists. This facilitates the rangers are patrolling the park. Because the rangers are spread all over the park, the communication devices relay data to and from more remote locations to less remote locations according to the ad-hoc protocol.

Advantageously, this provides for a communication network with no fixed network topology, thereby allowing for lower network set up costs and dynamic network scalability, while allowing for any node to communicate with any other node within the network. The infrastructure of the network varies as the number of communication nodes varies within the ad-hoc network. Also, since the network is low bandwidth and has low Tx/Rx range, receiver and transmitter costs are minimal. Furthermore, such ad-hoc network does not require infrastructure like a communication tower to be installed in a park. Therefore, a natural environment is not disturbed and not disfigured by such installation.

Of course, it is highly advantageous to structure the ad-hoc network protocol to support transceivers of different communication range in order to allow for park staff to form the majority of the ad-hoc "infrastructure."

Figure 14:
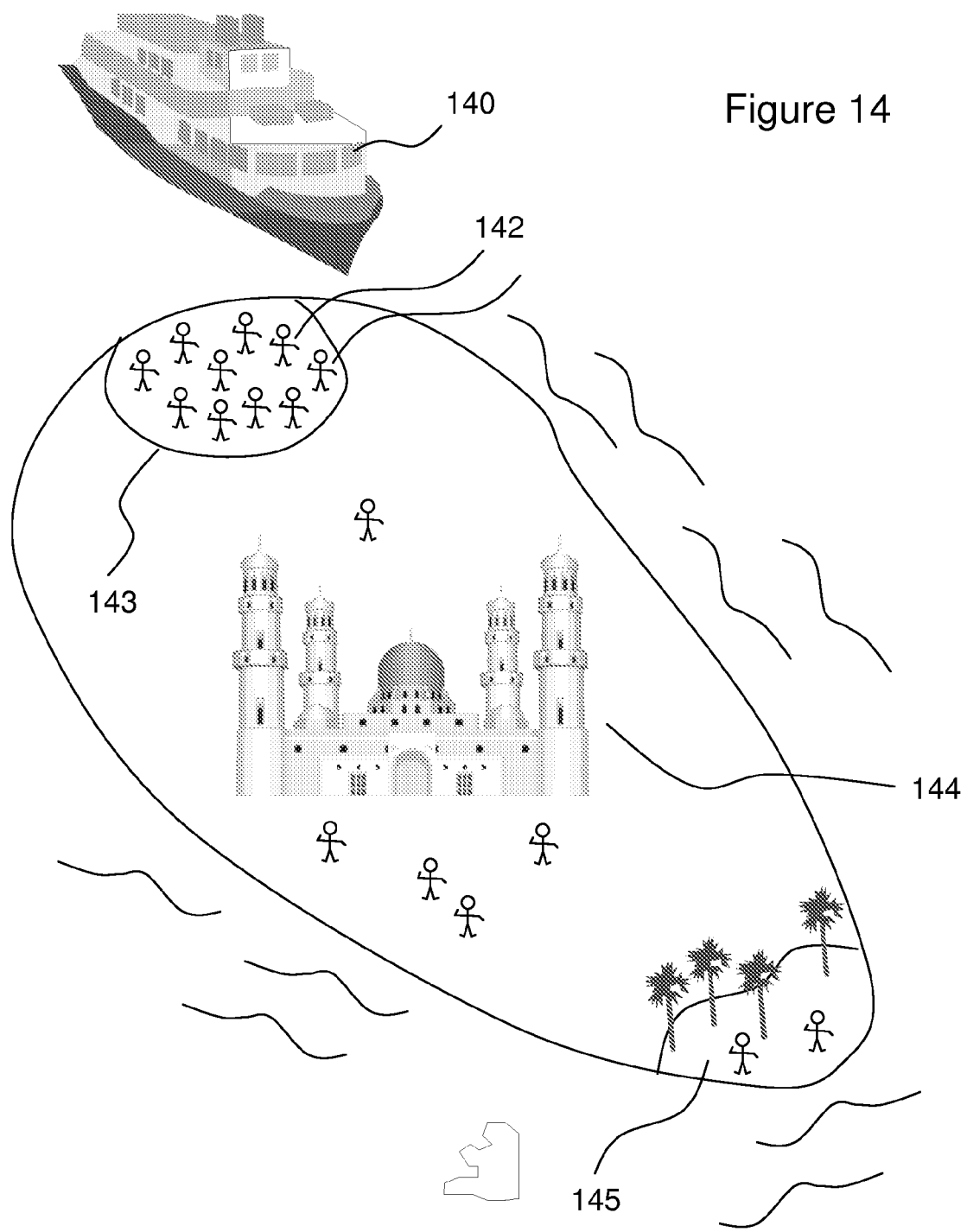

Further advantageously, an absence of superstructure for having a functional communication system provides with another alternative wherein an entire ad-hoc network is also mobile. Referring to FIG. 14, a simplified mobile ad-hoc network according to another embodiment is shown. A cruise ship 140 is docked at the quay, the crewmembers and the tourists 142 are given a communication device while debarking. Most of the time, people follow established tourist paths to visit the local areas of interest. For example, some people are interested in shopping in town 143, others are on their way to visit the historic church 144, whereas some are more interested in spending time on the fabulous beach 145 on the other side of the island. Statistically, it is most likely that a larger number of people found in the town 143 will want to communicate with the ship than those on the beach 145. Therefore, it is not significant that people on the beach are too far from other tourists or crewmembers for example for being reached through the ad-hoc network. However, the chances are high that people visiting the church 144 are reachable via transceivers carried by people along the way as communication nodes.

Advantageously, people 142 in communication range of other communication nodes easily communicate with the ship for example, allowing them to get information. When the ship is leaving the island, the ad-hoc network travels with the ship. On a next docking and disembarkation, another ad-hoc network is created. A purpose of such ad-hoc networks is to allow a large proportion of a constrained population to communicate one with the other, without relying on any infrastructure communication equipment.

Of course, when the communication nodes generate a signal, protocol data is within the signal such that upon transmission of the generated signal, another node receiving the generated signal is capable of identifying the protocol for properly routing the signal according to the protocol.

For example, each transmission includes a transmission identifier having an originating node identifier, a destination node identifier, a protocol identifier and the transmission content. When a node receives a transmission, it compares the transmission identifier to determine if it has previously received the transmission. If it has previously received the transmission, then the transmission is ignored. If it has not previously received the transmission, the transmission identifier is analysed to see if the destination node is the current node. If it has not previously received the transmission and the transmission is not destined for the current node then the transmission is retransmitted via the transmitter at that node. As such, every node analyses each transmission only once and retransmits each transmission only once. That said, each node may receive each transmission a plurality of times.

Advantageously, having such a multi-directional relationship network offers alternate paths for the signal to propagate from a source to a remote destination.

The entire contents of U.S. patent application Ser. No. 10/342,279 filed on Jan. 15, 2003, are hereby incorporated by reference.

Numerous other embodiments may be envisaged without departing from the spirit or scope of the invention.

What is claimed is:

1. A node comprising:
a processor
a transceiver in communication with the processor for receiving and transmitting signals, the received and transmitted signals being via wireless communication medium;
the processor for generating a signal for transmission from the node to a destination node, the destination node being another node of a plurality of nodes of which the node forms a predetermined part;
the processor executing a process for encoding within the signal a flag relating to the transmission of data from the node to the destination node, the flag having a first value when the destination node is within transmission range of the transceiver and a second value when the destination node is not within transmission range of the transceiver.

2. A node according to claim 1 further comprising;
determining with the process an action upon receiving a signal from a further node of the plurality of nodes, the action being retransmitting the received signal when the flag within the received signal is set to the second value and the destination node of the received signal is not within transmission range of the transceiver, generating a new transmission signal in dependence of the received signal and with the flag set to the first value when the flag within the received signal is set to the second value and the destination node of the received signal is within transmission range of the transceiver, and not retransmitting the received signal when the flag within the received signal is set to the first value.

3. A node according to claim 1 further comprising;
determining with the process a first protocol from a plurality of protocols when the flag is set to the first value, the first protocol selected being determined in dependence upon the range to the destination node and minimizing a power consumption of transmitting the signal with the first receiver; and determining with the process a second protocol from the plurality of protocols, the second protocol selected being determined in dependence upon at least the range to the destination node and minimizing a power consumption of transmitting the signal with the first receiver.

4. A method comprising:
providing a node comprising:
  a processor;
  a first transceiver in communication with the processor for receiving and transmitting signals according to a first wireless communication standard characterised by at least a first range; and
  a second transceiver in communication with the processor for receiving and transmitting signals according to a second wireless communication standard characterised by at least a second range, the second range being greater than the first range;
  providing a process in execution upon the processor for generating a signal relating to information to be transmitted from the node to a destination node, the process providing the signal to a determined one of the first transceiver and second transceiver, the determination being made in dependence upon at least the first range and the range of the destination node from the node.

5. A method according to claim 4 wherein,
the first transceiver and second transceiver are the same physical transceiver, the first transceiver being when the physical transceiver is operated at a first predetermined set of operating conditions and the second transceiver being when the physical transceiver is operated at a second set of predetermined operating conditions, the first and second predetermined sets of operating conditions resulting in the second range being greater than the first range.

6. A method according to claim 4 wherein,
the first transceiver and second transceiver are the same physical transceiver, the first transceiver being when the physical transceiver is operated according to a first protocol and the second transceiver being when the physical transceiver is operated according to a second protocol, the second protocol resulting in the second range being greater than the first range.

7. A method according to claim 4 wherein,
generating the signal with the processor comprises setting at least a first field within the signal, the first field setting being determined in dependence upon at least one of which transceiver is used to transmit the signal and whether the range of the destination node is outside the first range.

8. A method according to claim 7 further comprising,
receiving with the process a signal transmitted from another node intended for the destination node and determining whether to retransmit the signal, the determination being made upon at least the setting of the first field within the signal received.

9. A method according to claim 7 wherein;
determining whether the range to the destination node is outside the first range is determined by the processor previously transmitting a signal intended for the destination node without a known available route using the first transceiver and not receiving a confirmation signal from the destination node.

10. A method comprising:
providing a plurality of communication nodes including at least a first communication node in wireless transmission range with a predetermined subset of the plurality of communication nodes, each communication node comprising:
  a processor;
  a first transceiver in communication with the processor for receiving and transmitting signals according to a first wireless communication standard characterised by at least a first range; and
  a second transceiver in communication with the processor for receiving and transmitting signals according to a second wireless communication standard characterised by at least a second range, the second range being greater than the first range;
executing a process upon each processor, the process for generating a signal relating to information to be transmitted from a node to a destination node and providing the signal to a determined one of the first transceiver and second transceiver, the determination being made in dependence upon at least the first range and the range of the destination node from the node.

11. A method according to claim 10 wherein,
a predetermined portion of the plurality of nodes comprise a single physical transceiver wherein the first transceiver is provided when the physical transceiver is operated at a first predetermined set of operating conditions and the second transceiver is provided when the physical transceiver is operated at a second set of predetermined operating conditions, the first and second predetermined sets of operating conditions resulting in the second range being greater than the first range.

12. A method according to claim 10 wherein,
a predetermined portion of the plurality of nodes comprise a single physical transceiver wherein the first transceiver is provided when the physical transceiver is operated according to a first protocol and the second transceiver is provided when the physical transceiver is operated according to a second protocol, the first and second protocols being such that the second range is greater than the first range.

13. A method according to claim 12 wherein,
the process having determined to transmit with the first receiver selects the first protocol from a plurality of protocols, the first protocol selected being determined in dependence upon the range to the destination node and minimizing a power consumption of transmitting the signal with the first transceiver; and
the process having determined to transmit with the second receiver selects the second protocol from the plurality of protocols, the second protocol selected being determined in dependence upon at least the range to the destination node and minimizing a power consumption of transmitting the signal with the first transceiver.

14. A method according to claim 13 wherein,
the range to the destination node is measured in a number of hops and the second protocol is further determined in dependence upon minimizing the number of hops for this signal.

15. A method according to claim 10 wherein,
the process in generating the signal establishes at least a first field within the signal, the first field setting being determined in dependence upon at least one of which transceiver is used to transmit the signal and whether the range of the destination node is outside the first range.

16. A method according to claim 15 further comprising,
receiving with the process a signal transmitted from another node of the plurality of nodes intended for the destination node and determining whether to retransmit the received signal, the determination being made upon at least the setting of the first field within the received signal.

17. A method according to claim 15 wherein;

determining whether the range to the destination node is outside the first range is determined by the processor previously transmitting a signal intended for the destination node without a known available route using the first transceiver and not receiving a confirmation signal from the destination node.

\* \* \* \* \*